United States Patent [19]

Ohsato et al.

[11] 4,243,400

[45] Jan. 6, 1981

[54] APPARATUS FOR PRODUCING FIBERS FROM HEAT-SOFTENING MATERIALS

[75] Inventors: Nobuyoshi Ohsato; Keihachiro Tanaka; Eiji Mizushima, all of Itami, Japan

[73] Assignee: Nippon Sheet Glass Co., Ltd., Japan

[21] Appl. No.: 958,444

[22] Filed: Nov. 7, 1978

Related U.S. Application Data

[62] Division of Ser. No. 715,648, Aug. 18, 1976, Pat. No. 4,135,903.

[30] Foreign Application Priority Data

Aug. 20, 1975 [JP] Japan .................... 50-101618

[51] Int. Cl.³ .................................................. C03B 37/06
[52] U.S. Cl. ............................................. 65/16; 425/7
[58] Field of Search ............................ 425/7; 65/5, 16

[56] References Cited

U.S. PATENT DOCUMENTS

| | | | |
|---|---|---|---|
| 1,856,679 | 5/1932 | Williams et al. | 425/7 |
| 3,253,783 | 5/1966 | Probst et al. | 425/7 |
| 3,282,668 | 11/1966 | Mabru | 425/7 |
| 3,340,334 | 9/1967 | Feldmann et al. | 425/7 |
| 3,501,802 | 3/1970 | Ullman et al. | 425/7 |
| 3,592,391 | 7/1971 | Bender et al. | 425/7 |
| 3,658,311 | 4/1972 | Giaabattista et al. | 425/7 |
| 3,744,944 | 7/1973 | Chao | 425/7 |
| 3,752,611 | 8/1973 | Reed et al. | 425/7 |
| 4,116,656 | 9/1978 | Mukai et al. | 425/7 |

FOREIGN PATENT DOCUMENTS

| | | | |
|---|---|---|---|
| 1433056 | 2/1969 | Fed. Rep. of Germany | 425/7 |
| 1483566 | 2/1969 | Fed. Rep. of Germany | 425/7 |
| 1177874 | 4/1959 | France | 65/5 |
| 15154 | 11/1886 | United Kingdom | 65/16 |
| 657942 | 9/1951 | United Kingdom | 65/5 |
| 139971 | of 1961 | U.S.S.R. | 425/7 |

*Primary Examiner*—Jay H. Woo
*Attorney, Agent, or Firm*—Wenderoth, Lind & Ponack

[57] ABSTRACT

Method and apparatus for producing fibers from a heat-softening material in which the heat-softening material is heated to a viscous melt, and directly and continuously flowed out while its sectional shape being rendered substantially circular. High speed gas streams having a component in the tangential direction of the circular sectional surface of the melt and a component which approaches the central axial line of the melt towards the flowing direction of the melt and then departs from the central axial line are jetted out onto the melt that has been flowed out. The high speed gas streams cause the melt to rotate around its central axial line and transform it into a substantially conical shape whose cross section gradually decreases towards its flowing direction in a first zone. In a second zone subsequent to the first zone, the melt is caused to advance in the form of fiber from the tip of the cone in the flowing direction and outwardly in the radial direction.

19 Claims, 57 Drawing Figures

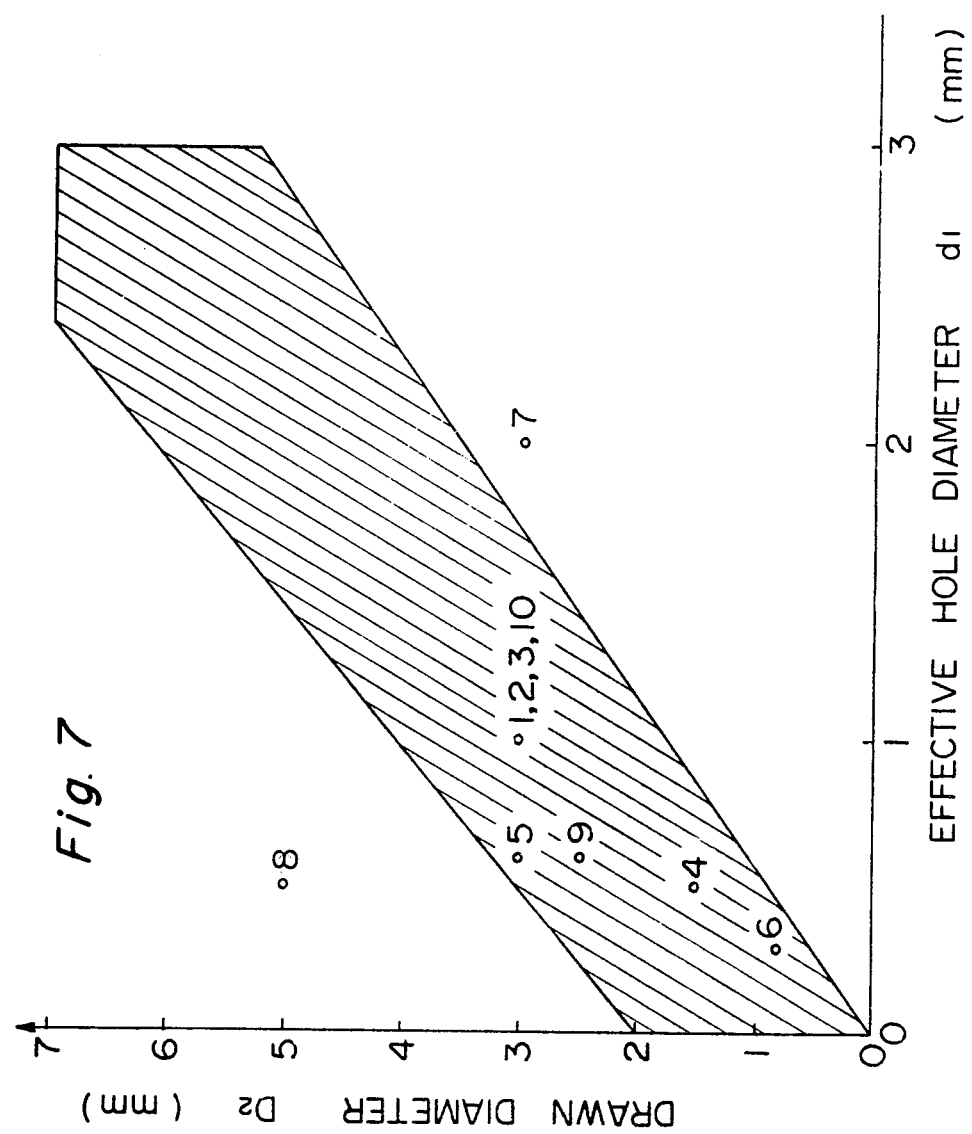

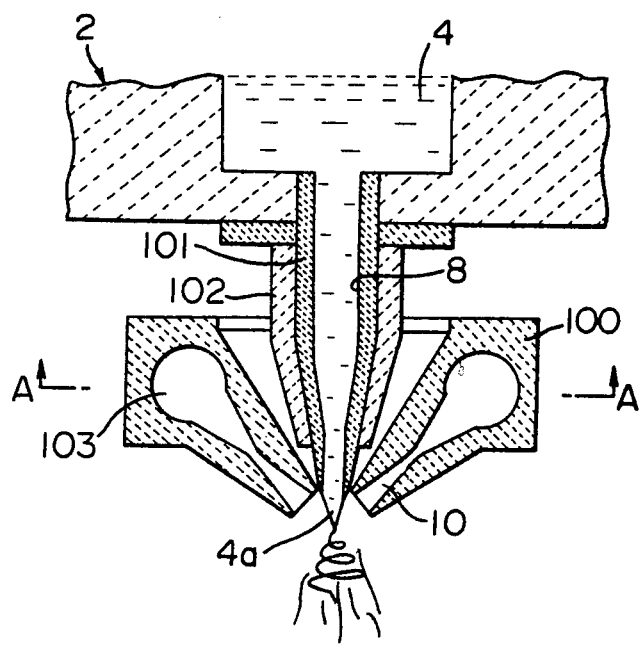
Fig. 8-a
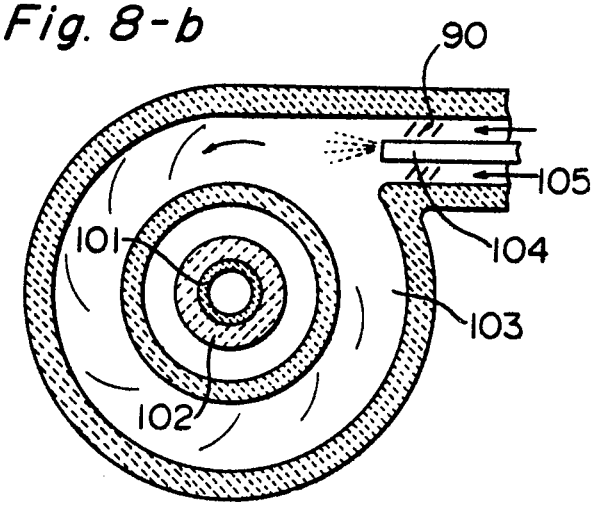
Fig. 8-b

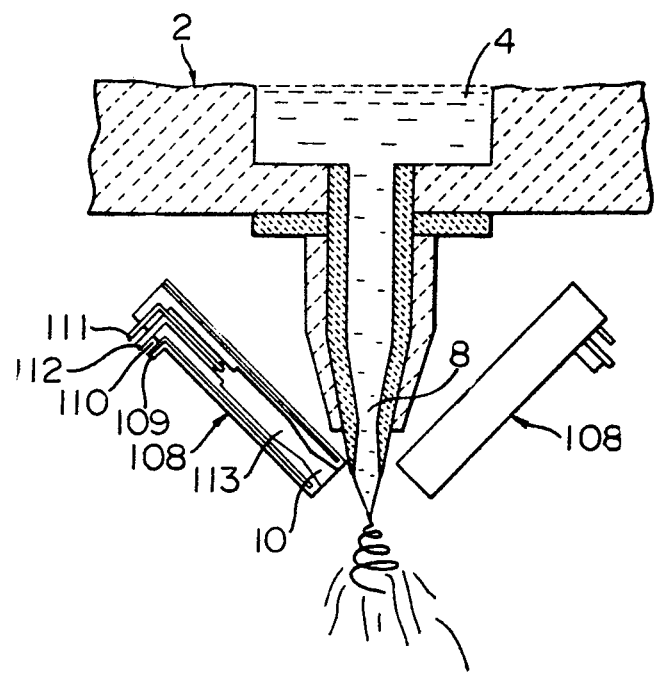
Fig. 9-a
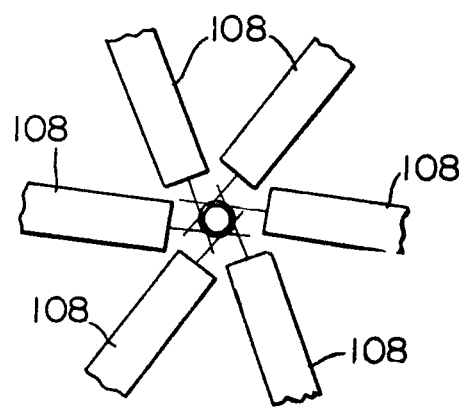
Fig. 9-b

Fig. 10-a
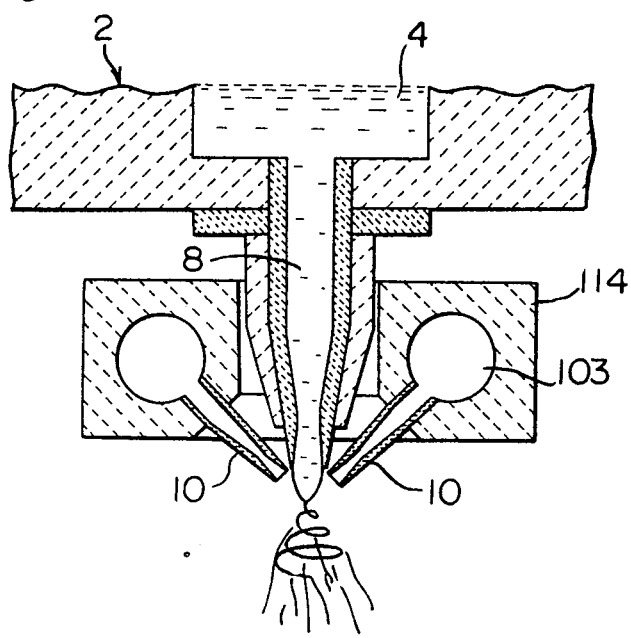
Fig. 10-b
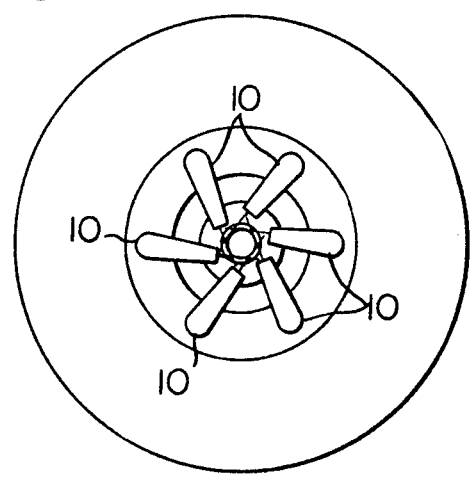

Fig. 11-a
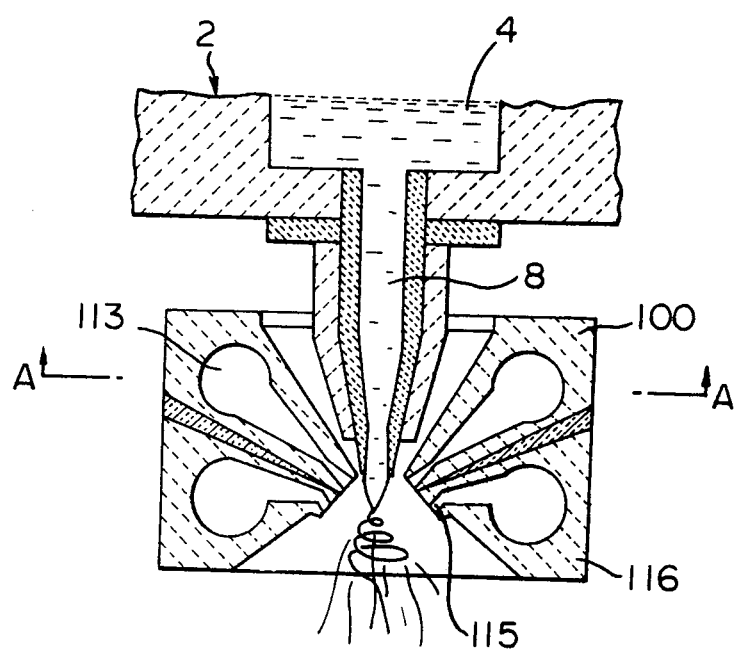
Fig. 11-b
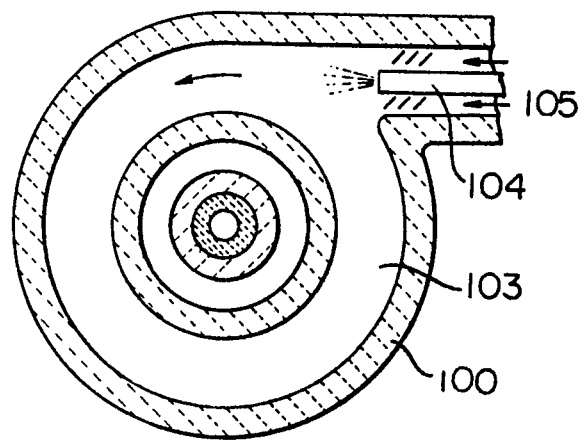

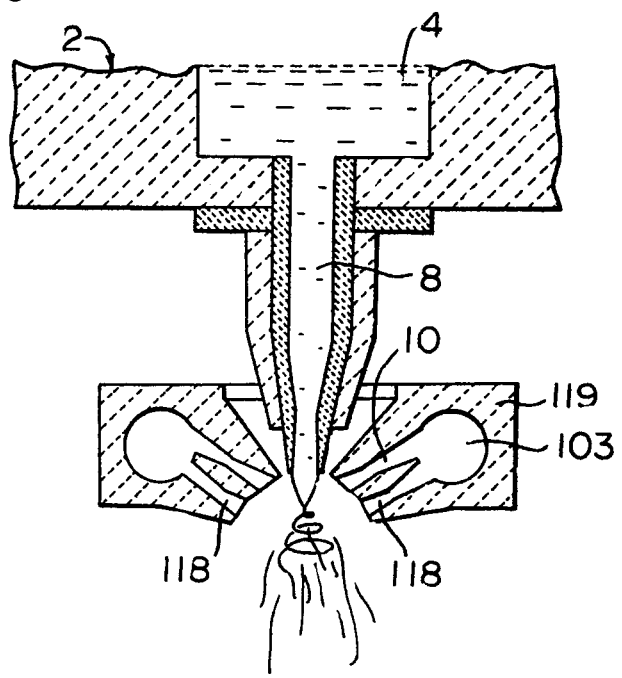
Fig. 12-a
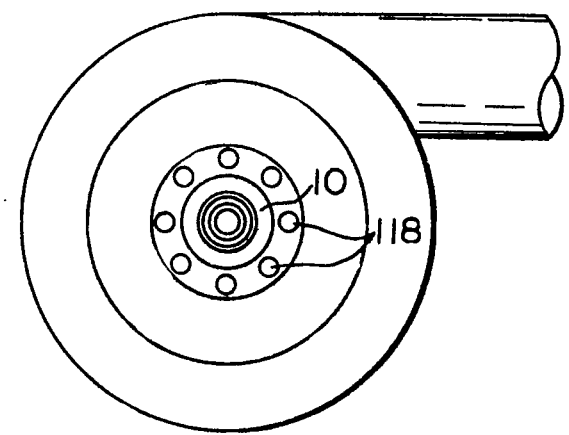
Fig. 12-b

Fig. 13-a
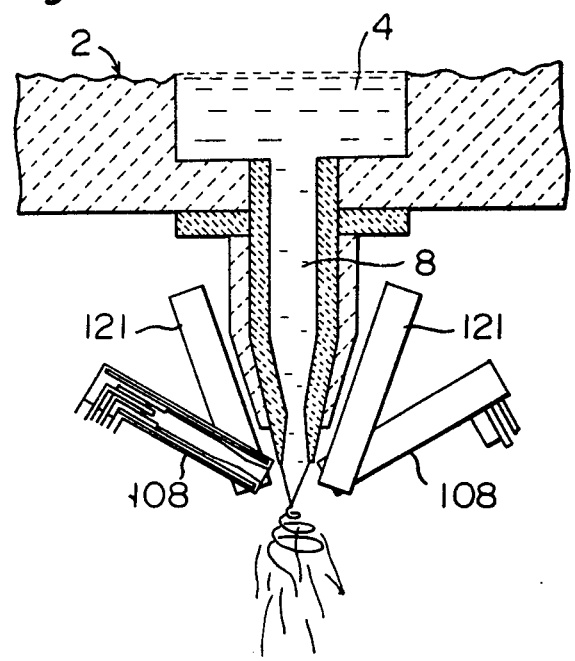
Fig. 13-b
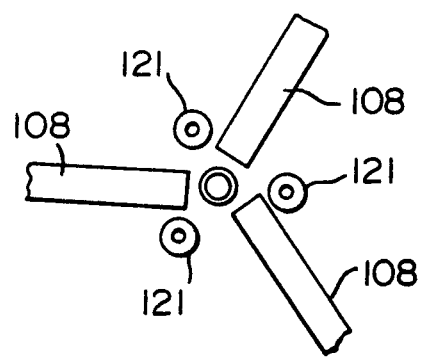

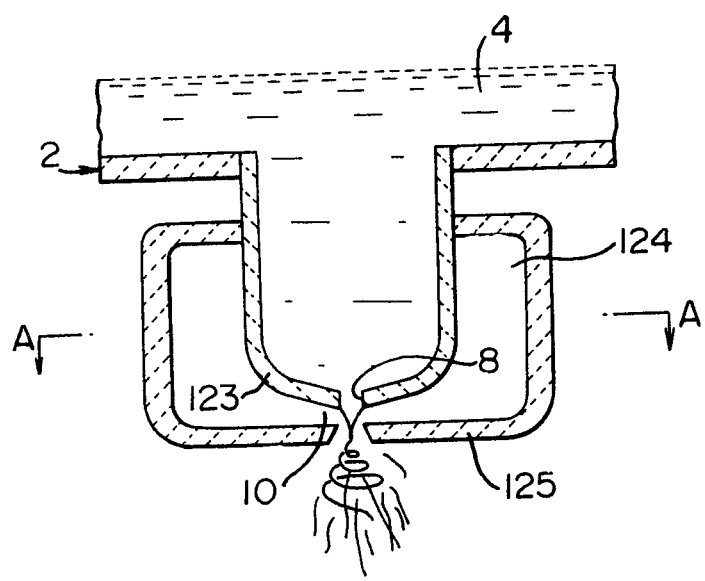
Fig. 14-a
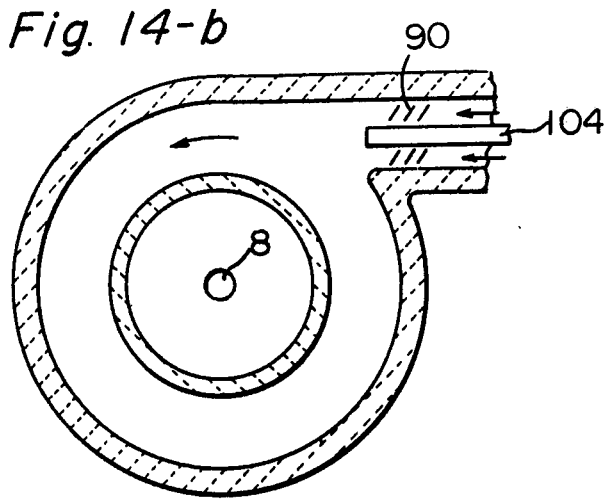
Fig. 14-b

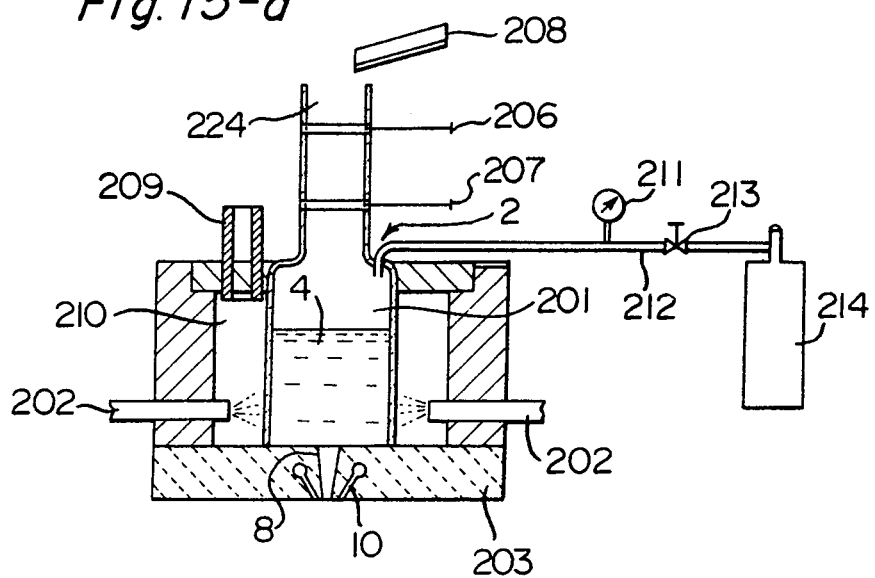
Fig. 15-a
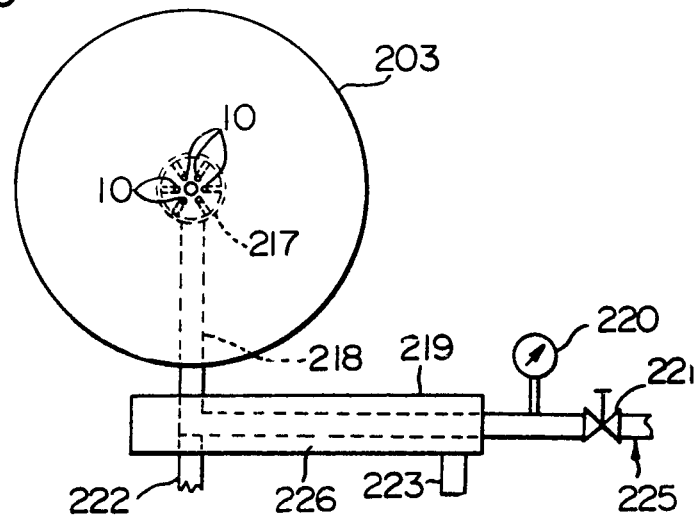
Fig. 15-b

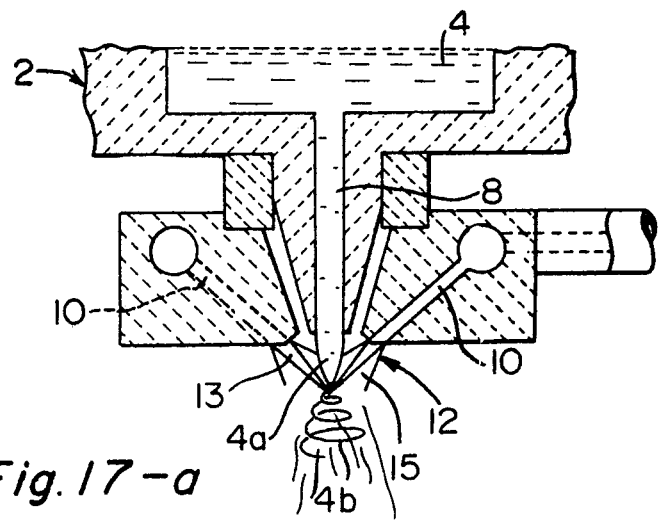
Fig. 17-a
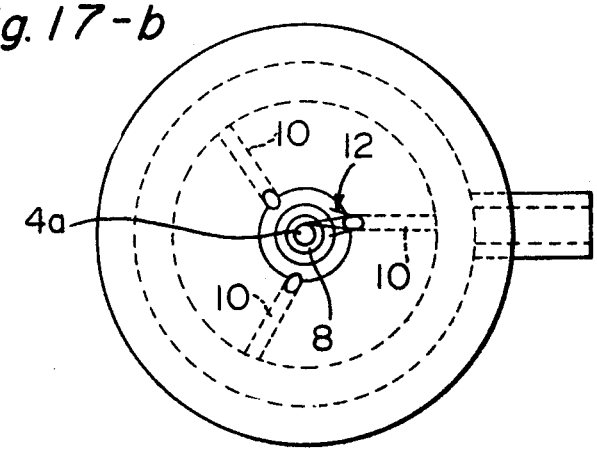
Fig. 17-b
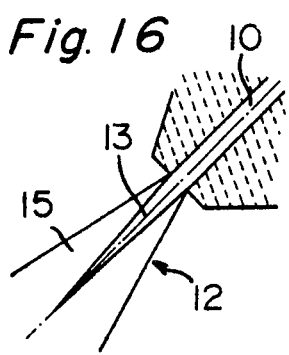
Fig. 16
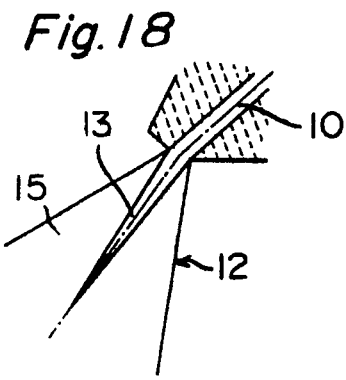
Fig. 18

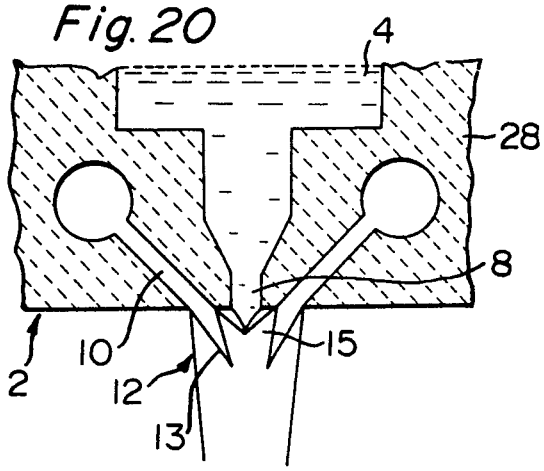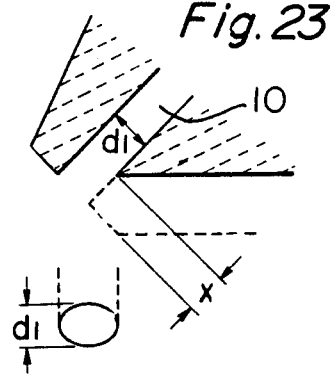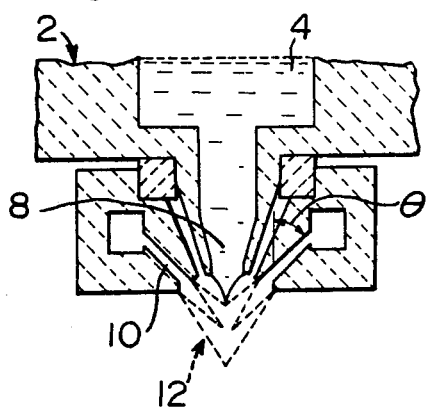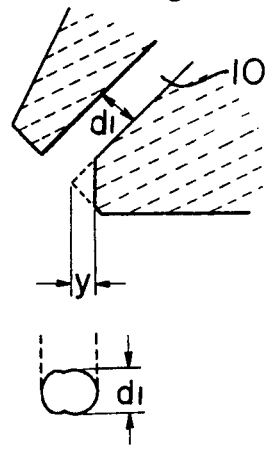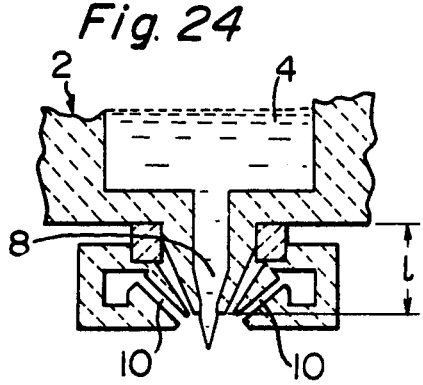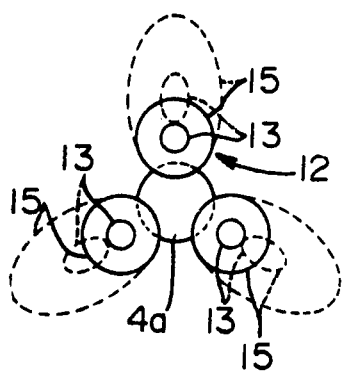

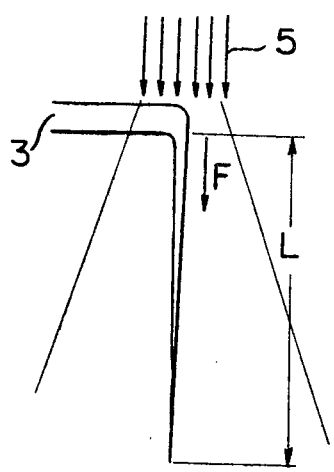
Fig. 25-a
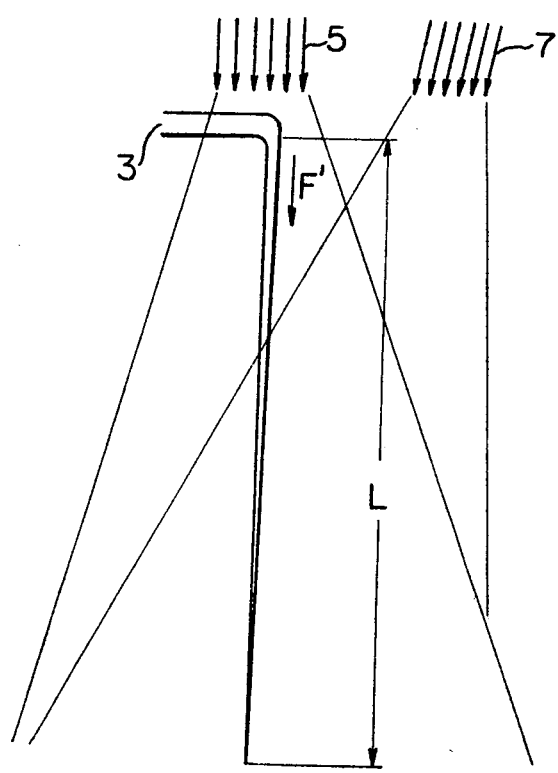
Fig. 25-b
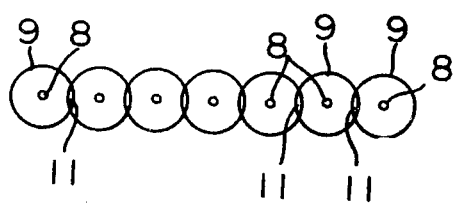
Fig. 26-a
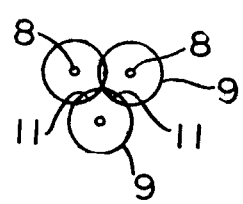
Fig. 26-b
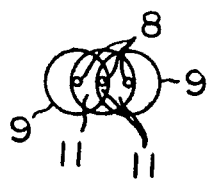
Fig. 26-c
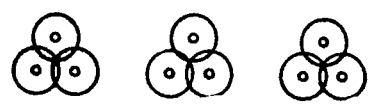
Fig. 26-d Fig. 27-a
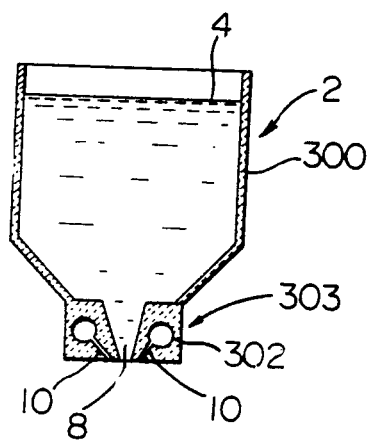
Fig. 27-b
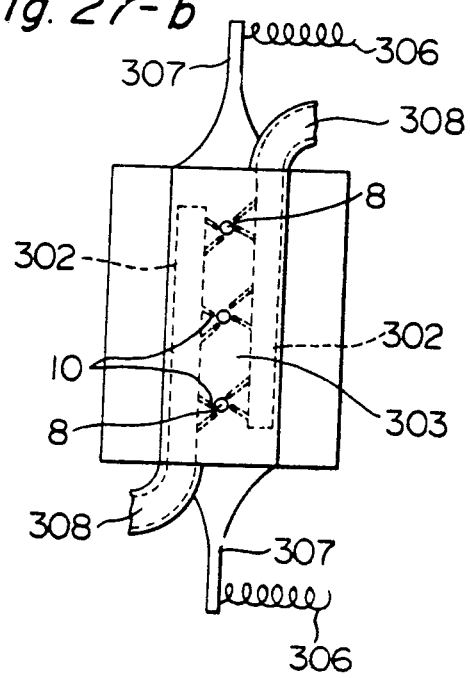

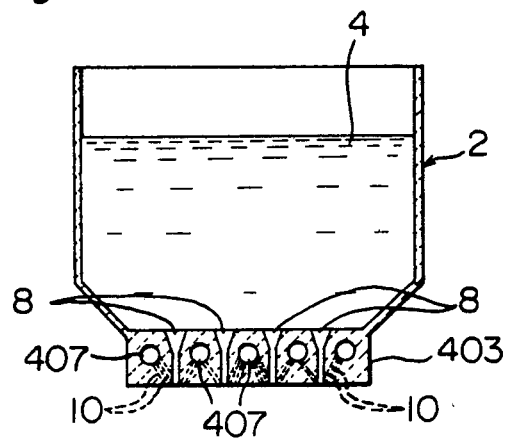
Fig.28-a
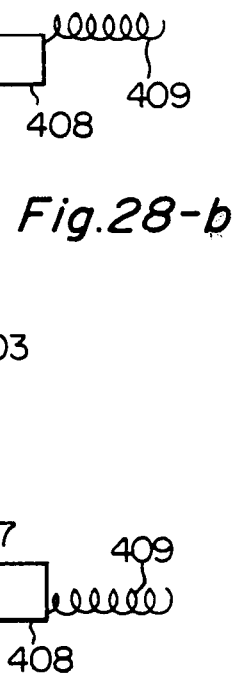
Fig.28-b

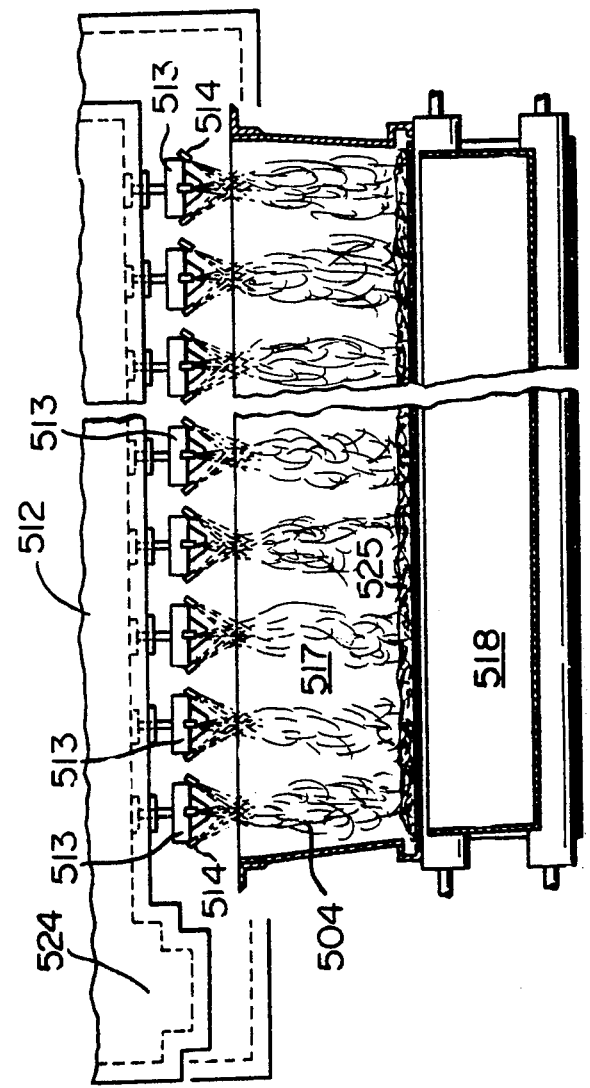

Fig. 31-a
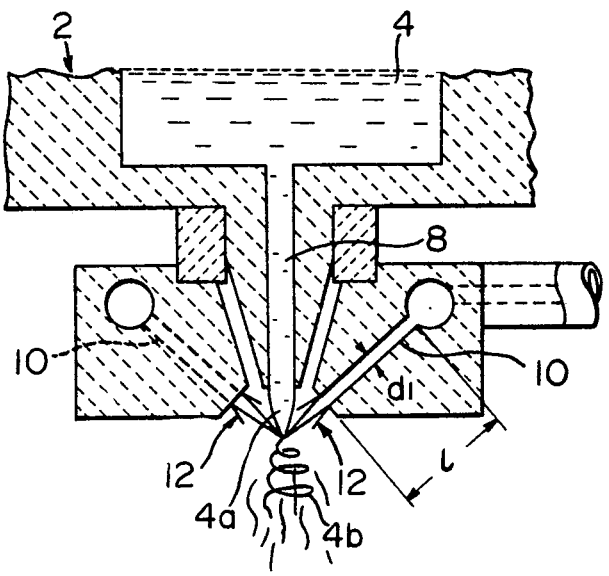
Fig. 31-b
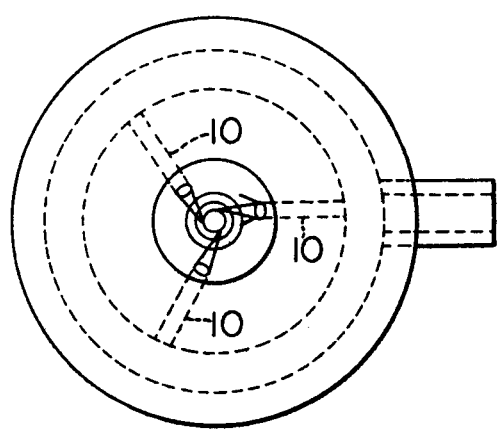

Fig. 36-a
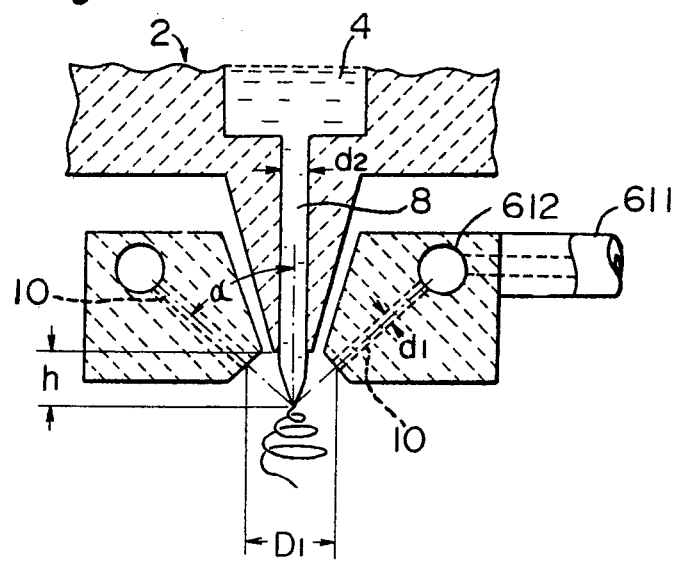
Fig. 36-b
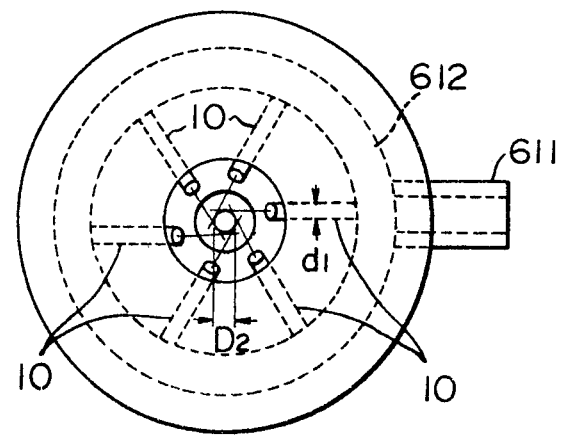

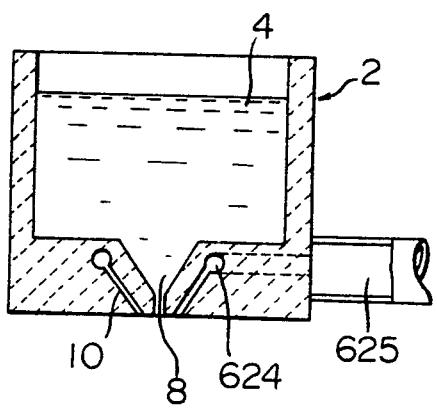
Fig. 37-a
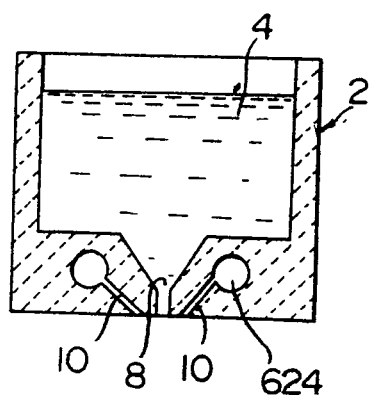
Fig. 38-a
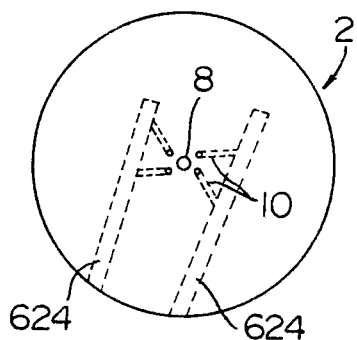
Fig. 37-b
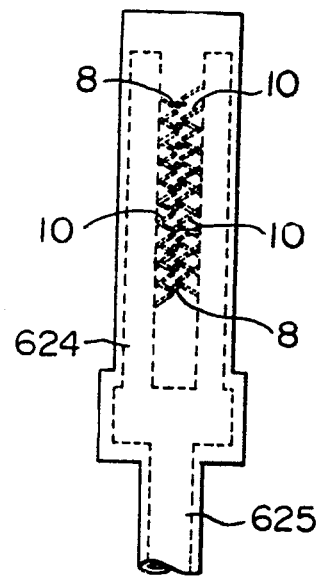
Fig. 38-b

APPARATUS FOR PRODUCING FIBERS FROM HEAT-SOFTENING MATERIALS

This is a Division, of application Ser. No. 715,648, filed Aug. 18, 1976 now U.S. Pat. No. 4,135,903.

FIELD OF THE INVENTION

This invention relates to a method and an apparatus for producing fibers from a heat-softening material such as glass, plastics and metals, and more specifically, to a method and an apparatus for producing fibers from a heat-softening material which comprises heating the heat-softening material to form a viscous melt and converting the melt into a fibrous form by the action of a high speed gas stream.

DESCRIPTION OF THE PRIOR ART

Fibers produced from a heat-softening material, for example, glass fibers can be classified roughly into two types. One type is what is called short fibers which have a diameter of several microns to several tens of 10 microns and a length of several millimeters to several hundred mm. Prior suggestions for the manufacture of these short fibers include, for example, (1) a method utilizing a centrifugal force (a centrifugation method or a rotary method), (2) a method which comprises producing solid fibers from a viscous mass of a heat-softening material, heating the fibers to render them viscous and at the same time blowing the fibers by a high speed gas stream to draw them (a blow method or flame method), and (3) a method which comprises directly rendering the heat-softening material viscous, and blowing it by a high speed gas stream (a slit method or vertical blowing method).

Another type of fibers are what is called filaments or long fibers for use in reinforcing plastics which have a diameter of several microns to several ten microns and a markedly large length. A drum wind-up method has been largely used for producing these long fibers.

Recently a toration method has been developed which can be applied to the production of both short fibers and long fibers (Japanese Laid-Open Pat. Publication No. 125632/74). It is well known that a heat-softening material can be made into fine particles or fibers by rendering it liquid or viscous, and placing it in a high speed gas stream.

The centrifugation method (1) comprises feeding a molten heat-softening material to a rotating disc or spinner, and blowing away a filamentary substance which comes out from holes provided on the periphery of the disc or spinner by means of a high speed gas stream. This is thermoeconomically advantageous, but has the defect that the rotating part of the apparatus which is to be elevated to a high temperature is deteriorated rapidly, or the length of the resulting fibers is short.

The blow method (2) involves introducing primary fibers formed continuously into a high speed gas stream held at high temperatures thereby to heat-soften the primary fibers and at the same time, drawing the fibers by the high speed gas stream. This method can afford short fibers of good quality having a small diameter and a large length. However, since the re-heat-softening and drawing of the primary fibers are carried out simultaneously by the high temperature high speed gas stream, the energy of motion required for the drawing of the primary fibers cannot be balanced with the thermal energy requred for heat-softening. Thus, in order to impart the energy required for heat-softening (an especially high energy is required because the efficiency of heat transmission from the gas to the heat-softening material is poor), a gas fuel is required in an amount more than necessary to impart energy required for drawing. In order to remove this defect, an attempt was made to pre-heat the primary fibers immediately before introduction into the high speed gas stream (for example, U.S. Pat. No. 2,607,075). But the results obtained were not entirely satisfactory.

The slit method (3), as disclosed, for example, in U.S. Pat. No. 2,626,424 and British Pat. No. 606,943, comprises heating a heat-softening material to allow it to flow freely, passing the free flow through a nozzle or slit, and applying a high speed jet stream of gas to a stream of the heat-softening material that flows through the nozzle or slit thereby to blow away the heat-softening material in the form of fibers. According to this method, heat efficiency is extremely good. But it has the defect that the stream of the heat-softening material that flows through the nozzle or slit is divided by the high speed gas stream and becomes discontinuous, and consequently, the diameter of the resulting fibers becomes non-uniform to form a film (flaky), balls, or shots (thick fibers). In greater detail, a high speed gas stream to be jetted out onto a stream of material that flows out through a nozzle or slit is somewhat inclined to the stream of the material. The viscous heat-softening material forms a conical shape at a part just apart from the tip of the nozzle or slit and, the heat-softening material in the form of fibers comes out from the tip of the conical shape. The size of the cone changes periodically with time to form a discontinuous flow. As a result, non-uniformity in the amount of flow occurs, and unfiberized masses such as those called shots, films or balls are generated. The following appears to be the reason for these defects. The heat-softening material in the viscous state which has flowed from the nozzle or slit is carried away by the action of the high speed gas stream. But since the stream of the material is a free-flowing stream, and therefore is not a sufficiently continuous stream, larger amounts of large masses of the material than the amount of flow of the material from the nozzle or slit are carried away intermittently by the action of the stream of high speed gas. Since at this moment, the amount of the material to be carried away by the high speed gas stream increases, fiberization is not sufficiently performed. After the large masses have been carried away, the material becomes absent, and the high speed gas stream does not act on the material, and the flowing of the material from the nozzle or slit is dependent only on the free-flowing stream of the material up to the nozzle or slit. When the forward end of the stream of the material flowing reaches a part on which the high speed gas stream acts, the high speed gas stream acts on it again to carry away the material as large masses. The above cycle is performed instantaneously. In order to prevent it, the force of the gas stream acting on the stream of the material must be weakened. But this, on the other hand, makes it difficult to perform the drawing of the material effectively, and affords thick fibers. At the same time, the amount of flow of the material is restricted, and the efficiency becomes poor.

SUMMARY OF THE INVENTION

Accordingly, it is a primary object of this invention to provide a method and an apparatus for producing short fibers or long fibers from a heat-softening material effectively without involving the defects of the prior art methods described hereinabove.

Another object of this invention is to provide a method and an apparatus for producing high quality fibers from a heat-softening material at a considerably higher energy efficiency than in the known conventional methods.

Still another object of this invention is to provide an apparatus which is compact and has a long lifetime and which can produce high quality fibers from a heat-softening material at a high energy efficiency.

According to the present invention, there is provided a method for producing fibers from a heat-softening material, which comprises heating the heat-softening material to form a viscous melt, and continuously flowing the melt; and jetting out at least three substantially straight-line high speed gas streams disposed at intervals around the melt in its peripheral direction, or an annular high speed gas stream surrounding the melt in an annular shape, each of said streams having a component in the tangential direction along the cross-section of the melt and a component which gradually approaches the central axial line of the melt toward the flowing direction of the melt and then gradually departs from the central axial line, to the melt which has flowed out, whereby the melt is rotated about its central axial line and formed into a substantially conical shape in a first zone which ranges from the flow-initiating part of the melt to the part at which the gas stream most closely approaches the central axial line of the melt, and in a second zone subsequent to the first zone, the melt is allowed to fly in a fibrous form from the tip of the conical shape in a vortex form in the flowing direction and outwardly in the radial direction.

The invention also provides an apparatus for producing fibers from a heat-softening material, said apparatus comprising a melting crucible having flow-out nozzles for heating said heat-softening material to form a viscous melt and flowing it continuously through the flow-out nozzles; and a gas jetting means for jetting out at least three substantially straight-line high speed gas stream disposed at intervals around the melt in its peripheral direction, or an annular high speed gas stream surrounding the melt in an annular shape, each of said streams having a component in the tangential direction along the cross-section of the melt and a component which gradually approaches the central axial line of the melt toward the flowing direction of the melt and then gradually departs from the central axial line, to the melt which has flowed out, whereby the melt is rotated about its central axial line and formed into a substantially conical shape in a first zone which ranges from the flow-initiating part of the melt to the part at which the gas stream most closely approaches the central axial line of the melt, and in a second zone subsequent to the first zone, the melt is allowed to fly in a fibrous form from the tip of the conical shape in a vortex shape in the flowing direction and outwardly in the radial direction.

BRIEF DESCRIPTION OF THE DRAWINGS

FIG. 7 is a diagram showing the effective diameter of a nozzle for jetting out the gas stream on the axis of abscissas and the drawn diameter of the nozzle on the axis of ordinates;

FIGS. 8a, 9a, 10a, 11a, 12a, 13a, 14a and 15a are simplified sectional view of some embodiments of the apparatus of this invention;

FIGS. 8b, 11b and 14b are simplified sectional view taken along the line A—A of FIGS. 8a, 11a and 14a, respectively;

FIGS. 9b, 10b, 12b, 13b and 15b are simplified bottom views of the apparatus shown in FIGS. 9a, 10a, 12a, 13a and 15a, respectively;

FIGS. 16 and 18 are partial sectional views showing the relation between the shape of a gas stream jetting nozzle at its exit and a gas stream;

FIGS. 17a and 17b are a simplified sectional view and a simplified bottom view of an embodiment of the apparatus of the present invention;

FIG. 19 is a schematic view showing the relation between the shape of a gas stream jetting nozzle at its exit and a gas stream;

FIGS. 20, 21 and 24 are simplified sectional views of embodiments of the apparatus of the present invention;

FIGS. 22 and 23 are partial sectional views showing the details of the shape of a gas stream jetting nozzle at its exit;

FIGS. 25a and 25b are schematic views for illustrating the drawing of a melt in fibrous form by means of a gas stream;

FIGS. 26a and 26d are schematic views showing the arrangement of a plurality of melt flowing nozzles;

FIGS. 27a and 27b are a simplified sectional view and a simplified bottom view, respectively, of an embodiment of the apparatus of the present invention;

FIGS. 28a and 28b are a simplified sectional view and a simplified bottom view, respectively, of an embodiment of the apparatus of this invention;

FIG. 30 is a cross sectional view taken along the line A—A of FIG. 29;

FIGS. 31a and 31b are a simplified sectional view and a simplified bottom view, respectively, of the apparatus of this invention used in the Examples;

FIGS. 36a, 37a and 38a are simplified sectional views of embodiments of the apparatus of this invention used in the Examples; and FIGS. 36b, 37b and 38b are simplified bottom view of the apparatus shown in FIGS. 36a, 37a and 38a, respectively.

DETAILED DESCRIPTION OF PREFERRED EMBODIMENTS

Figure 1:
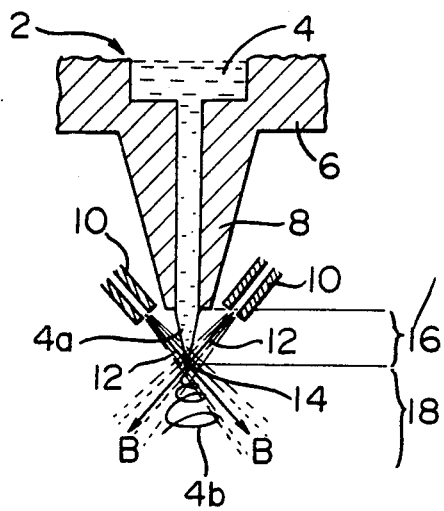
FIG. 1 is a simplified sectional view for illustrating the basic concept of the method of this invention.
Figure 2:
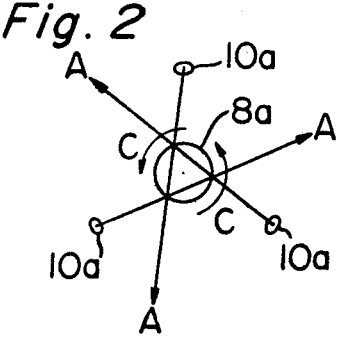
FIG. 2 is a simplified bottom view for illustrating the basic concept of the method of this invention.

Referring to FIGS. 1 and 2, the basic concept of the method of this invention for producing fibers from a heat-softening substance is described.

Basically, the method of this invention comprises (1) heating a heat-softening material to form a viscous melt and flowing it continuously; and (2) jetting out a specified high speed gas stream to the melt that has been flowed out.

Melting and flowing of the heat-softening material are accomplished, for example as shown in FIG. 1, by heating the heat-softening material in a melting crucible 2 (a part of which is shown in the drawings) by a suitable known method to change it into a viscous melt 4, and then directly and continuously flowing the melt 4 through a nozzle 8 provided in the crucible by the own weight of the melt and/or by the pressure inside the crucible. Preferably, the flow-out nozzle 8 is provided downwardly at a bottom wall 6 of the crucible, as shown. It may be provided in an optional direction on the bottom wall or side wall, etc. of the crucible so as to flow out the melt in any desired direction. It is preferred that the cross-sectional shape of the flow-out nozzle be circular and thus the melt 4 be flowed out from the crucible 2 with its cross-sectional shape being rendered substantially circular. Instead of melting the heat-softening material using the crucible, it is possible to move an elongated rod of solidified heat-softening material at a constant rate in its longitudinal direction, heat the tip of the rod, and to directly and continuously flow out the melt of the heat-softening material in an amount equal to the amount of movement. However, the use of the crucible of the type shown is preferred in view of the ease of heating and the ease of controlling the viscosity of the melt, etc. Preferably, the diameter of the cross section of the melt immediately after flowing, which depends upon the viscosity and surface tension of the melt and the diameter of the nozzle or rod, is generally 0.5 to 10 mm.

Then, a high speed gas stream is jetted out onto the melt which has been flowed continuously from the jet-out nozzle 8. In the method of this invention, at least three straight-line high speed gas streams 12 which are jetted out from at least three nozzles 10 disposed at intervals in the peripheral direction around the flow-out nozzle 8 (FIG. 2 shows only a hole 8a of the nozzle 8 and a hole 10a of the nozzle 10 in order to simplify the drawing), or an annular high speed gas stream jetted out from an annular high speed gas jetting nozzle disposed around the nozzle 8 is jetted against the melt. It is important that the gas stream to be jetted against the melt should contain a component in the tangential direction (the direction shown by arrow A in FIG. 2) along the cross-section of the melt flowing from the nozzle 8, and a component (shown by arrow B in FIG. 1) which gradually approaches the central axial line of the melt toward the flowing direction of the melt and then gradually departs from the central axial line.

By the action of the high speed gas stream described above, the melt is rotated about its central axial line, and formed into a substantially conical shape 4a whose section gradually decreases toward the flowing direction in a first zone 16 which ranges from the outlet port of the flow-out nozzle 8 to a part at which the gaseous stream most closely approaches the central axial line of the melt (point 14, to be referred to as a focal point). Where the central axial lines of the straight-line gas streams most closely approach the central axial line of the melt at different points on the central axial line of the melt, this focal point is the one at which an average of the distances between the central axial lines of the gaseous stream and the central axial line of the melt becomes minimum.

In the first zone 16, at least three straight-line high speed gaseous streams 12 or the annular high speed gaseous stream which act on the surface of the melt that has been flowed out have a component in the tangential direction (the direction shown by arrow A in FIG. 2). Hence, a rotating moment in the direction shown by arrow C in FIG. 2 acts on the melt, and causes the melt to rotate in the direction of arrow c around the central axial line of the melt. Furthermore, since in the first zone 16, the high speed gaseous stream also has a component in a direction (shown by arrow B in FIG. 1) gradually approaching the central axial line of the melt toward the flowing direction of the melt, the melt is restrained so that its cross section gradually decreases toward its flowing direction, whereby it is formed into a conical shape 4a which is tapered toward the flowing direction. It will be readily understood that the rotating angular speed of the melt being rotated gradually increases towards the flowing direction of the melt.

Preferably, the conical shape of the melt formed in the first zone 16 is such that its diameter at its smallest end is about 0.1 to 1 mm. Experiments of the inventors led to the confirmation that if the distance between the outlet of the nozzle 8 and the smallest end of the cone is too large, the flowing melt is likely to become discontinuous to form unfiberized masses, and therefore, it is preferred to adjust this distance to not more than 10 times the inside diameter of the flowout nozzle 8. On the other hand, these experiments show that if the above distance is too small, the melt which has flowed from the nozzle 8 immediately flies away in the tangential direction and does not possibly form a stable cone, and therefore, this distance is generally required to be larger than 20% of the inside diameter of the nozzle 8.

In a second zone 18 subsequent to the first zone 16, the melt is continuously flown as a fiber from the tip of the cone in the flowing direction and outwardly in the radial direction in a vortex form 4b which is spiral or helical or both. As a result of the flying of the melt from the tip of the cone 4a as one fiber, a pulling force in the flowing direction of the melt acts on the cone 4a, and is transmitted to the melt within the crucible 2 to promote the flowing of the melt through the nozzle 8. Thus, the amount of the melt lost from the cone as a result of the flying out of one fiber from its tip is made up for by a fresh flow of the melt. Consequently, the cone 4a is maintained stably and continuously without the flowing of the melt from the nozzle 8 becoming discontinuous. On the other hand, the melt 4b flown in the form of fiber from the tip of the cone 4a undergoes a pulling force by the force of inertia of its rotation and the high speed gas stream acting on it, and is thereby drawn and attenuated.

Stated in more detail, the component shown by arrow B in FIG. 1 of the high speed stream 12 departs from the central axial line of the melt toward the flowing direction of the melt in the second zone 18, and therefore, no restraining force is exerted on the melt which will decrease its cross sectional area, but a force which will diffuse the melt acts. The end of the cone 4a is still rotating at a considerably high speed. As a result, the melt flies out from the end of the cone 4a by the centrifugal force caused by rotation, and the fibrous melt that has flown away is accelerated by the action of the high speed gas stream. When the melt is slightly deviated in a certain direction from the rotating axial line of the melt by centrifugal force, a still greater centrifugal force acts on that part of the melt which has deviated, and this part flies away in a deviated direction. This is the beginning of flying of the melt. The fibrous melt which has thus flown away is accelerated by a component in the tangential direction (the direction shown by arrow A in FIG. 2) and a component in the direction departing from the central axial line of the melt toward the flowing direction of the melt (the direction shown by arrow B in FIG. 1).

Then, the melt at the cone 4a which is continuous to the fibrous melt which has flown away flies subsequently by the influence of the fibrous melt which has flown away. Since the end of the cone 4a is still rotating, the manner of flying changes continuously in the rotating direction. Consequently, one continuous fiber of the melt 4b flies in a vortex shape from the end of the cone 4a. The fibrous melt 4b which has flown away is accelerated by the high speed gas flow, and thereby drawn and attenuated. Thus, depending upon the extent of the drawing action of the high speed gaseous stream, continuous long fibers having a diameter of 10 to 100 microns, or short fibers having a diameter of 0.1 to 20 microns can, for example, be produced.

If required for the drawing and attenuating of the fibers, a separate high speed gas stream may further be applied to the melt that has flown away, in addition to the above-mentioned high speed gaseous stream.

The centrifugal force and the pulling force caused by the high speed gaseous stream which act on the fibrous melt in the second zone 18 are transmitted to the conical melt in the first zone 16. These forces are transmitted also to the melt within the flow-out nozzle 8 and the crucible 2. This promotes the flowing of the melt from the flow-out nozzle 8. Thus, the melt which is lost as a result of the flying of it from the end of the cone 4a is made up for by a fresh flow of the melt, and the conical shape 4a is stably maintained.

It is not altogether necessary to maintain the above gas stream at a high temperature. Preferably, it is maintained at a temperature at which the melt can be drawn as desired, for example, at a temperature of about 500° to 1,500° C. for glass. The preferred flow speed of the gaseous stream is 200 to 1,000 meters/sec. Examples of the gas are high pressure air, high pressure stream, and combustion wastes of gases.

According to the present invention described above, fibers of high quality can be produced at a considerably high energy efficiency. The inventors further discovered that various factors exerts various effects on the quality of the resulting fibers and the efficiency of production, etc. in the method of the present invention described hereinabove.

Effective hole diameter for flow out of the melt-flowing nozzle 8

In order to sufficiently draw the melt which has flown away in fiber form in the second zone 18, it is important to rotate the tip of the cone at higher speeds. When a plurality of straight-line high speed gas streams 12 are jetted out, the speed of rotation at the end of the cone (n in times/sec.) is expressed by $n = kv/2\pi r_o$ in which v is the component in the tangential direction of the speed of the gaseous stream, $r_o$ is the average of the distances between the central axis lines of the gas streams and the central axial line of the melt at focal point 14 (the drawn radius), and k is the coefficient of sliding. Accordingly, in order to increase the number of rotation (n) it is advantageous to maximize k and v and minimize $r_o$. Since generally the component in the tangential direction of the speed of the gas stream (v) is nearly equal to the sonic velocity and is thus constant, it is necessary to decrease $r_o$ and increase k. There is a limit to $r_o$ since if it is decreased too much, gas streams collide with each other to generate a disturbed flow, thus failing to form a stable conical shape. Thus, the coefficient of sliding must be maximized. The value k is the ratio of the speed of the melt to the speed of the gaseous stream, and becomes smaller if the force which acts to prevent the rotation of the melt by the action of the gas stream is greater. In the feasible operating range, k is about 0.01 to 0.5. Hence, increasing of the k value is very effective. It would be effective to reduce the viscosity of the melt or to decrease the diameter of the cross section of the flowing melt when it is desired to increase k while maintaining $r_o$ and v constant. We therefore attempted to reduce the viscosity of the melt while maintaining the diameter of the section of the melt immediately after flow out at a constant value of, say 3.0 mm, but found that since the viscosity of the melt is low in spite of the large diameter of the melt and the high torsion resistance due to rotation, the downstream part of the melt is blown away by the gaseous stream, unfiberized masses such as beads or flakes occur in great quantities, leading to the difficulty of forming fibers of good quality. We have also found that when the diameter of the melt at its section is adjusted to not more than 2.5 mm, preferably not more than 2 mm, the torsion resistance of the melt due to its rotation becomes exceedingly low, and therefore, phenomena such as splitting or blowing of the melt by the gaseous stream do not easily occur; and that the viscosity of the melt can be reduced to about 30 to 50 poises, and the torsion resistance due to the rotation of the melt becomes even lower. The diameter of the melt that has flowed out is defined by the effective hold diameter $d_2$ of the flow-out port of the flow-out nozzle 8 (obtained by dividing the product of the cross-sectional area of the hole multiplied by 4, by the length of the circumference). It was found therefore that preferably this effective hole diameter is adjusted to not more than 2.5 mm, especially not more than 2.0 mm (see Example 1 appearing hereinbelow).

Reduction of the effective hole diameter $d_2$ of the flow-out nozzle 8 means that the amount of the melt flowing through the nozzle is restricted. This also means that the output of fibers per unit time of fiber-forming operation is limited. It is undeirable therefore to decrease the effective hole diameter $d_2$ too much. In this sense, too, it is desirable to set the lower limit of the effective pore diameter at 0.5 mm. Of course, fibers of good quality can be obtained even if the effective hole diameter is less than 0.5 mm. In order to increase the amount of flow of the melt, the depth of the crucible is increased, or the inside of the crucible is pressurized so that a pressure of at least 25 cm aq., preferably at least 40 cm aq., is obtained at the outlet end of the flow-out nozzle.

(b) Viscosity of the melt

Heat-softening materials that can be fiberized by the method of this invention are, for example, glass, metals, and plastics. When it is desired to make fibers having a diameter of about 4 microns or less, controlling of the viscosity of the heat-softening material is extremely effective for rendering the fiber diameter finer and reducing the amount of unfiberized masses (flakes, balls, shots, etc.) (see Examples 2 to 4 appearing hereinbelow).

When the viscosity of the melt immediately before rotation by the gas stream in the first zone 16 exceeds 200 poises, the rotation of the melt does not proceed at high speed because of the resistance by viscousness, and it is difficult to draw the fibers efficiently. Furthermore, in this case, the drawing resistance is too high when drawing the melt in the second zone, and it is difficult to adjust the fiber diameter to not more than 5 microns.

On the other hand, when the viscosity of the melt becomes less than 10 poises, the melt is blown off by the high speed gas stream in the first zone and/or the second zone, and the proportion of fibers having the desired length decreases extremely, and the proportion of unfiberized masses such as balls or flakes becomes higher. The especially preferred viscosity of the melt is 50 to 100 poises. Within this viscosity range, a stable cone can be obtained in the first zone, and drawing can be performed efficiently in the second zone.

The viscosity of the melt immediately before the initiation of the rotation by the gas stream can be controlled by adjusting the temperature of the melt. When nozzles for flowing out the melt are used, the viscosity of the melt can be controlled by controlling the temperature of a pot for the melt or the nozzles. When a rod of the heat-softening material is used, the viscosity of the melt can be adjusted to the desired value by controlling the temperature of the rod.

(c) Inclination of the gas stream to the central axial line of the melt

As stated hereinabove, at least three straight-line gas streams or an annular gas stream is jetted out onto the melt which has flowed continuously from the flow-out nozzle 8. In view, for example, of the ease of controlling the direction of the jet gas stream, it is generally preferred to jet out at least three straight-line gas streams 12. On the other hand, it is necessary that the gaseous stream to be jetted out onto the melt has a component in the direction shown by arrow B in FIG. 1 (a direction inclined by some angle to the central axial line of the melt) as well as a component in the direction shown by arrow A in FIG. 2. It has been found that when at least three straight-line gas streams are used, they preferably form an angle of 20° to 70°, especially 35° to 55°, in the direction shown by arrow B in FIG. 1 with respect to the central axial line of the melt. When the angle of inclination is less than 20°, the force of pulling the melt directly in its advancing direction becomes stronger than the force to rotate the melt. This results in a tendency to the splitting of the melt and to the occurrence of unfiberized masses such as balls, shots or flakes. If the angle of inclination is more than 70°, the gas streams which have left the jet nozzles 10 spread as they advance, and as a result, collide with each other. Thus, the advancing of the gas streams is impeded, and a disturbed flow occurs to prevent the melt from advancing smoothly. In order to overcome these difficulties, the angle of inclination of the gas streams to the central axial line of the melt is preferably 35° to 55°.

Figure 3:
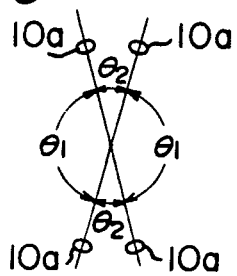
FIGS. 3 and 4 are schematic views showing the arrangement of nozzles for jetting out a gas.
Figure 4:
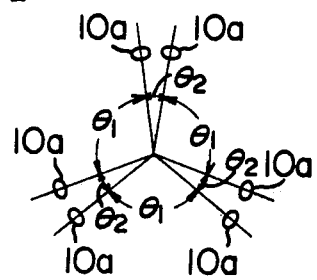

(d) Arrangement of high speed gas jet nozzles when using at least three straight-line high speed gas streams In order to rotate the cone 4a of the melt around the central axial line of the melt as desired in the first zone 16 by jetting out at least three straight-line high speed gas streams, it is important to arrange jet nozzles 10 symmetrically with the central axial line of the melt as a rotatory symmetrical axial line. Accordingly, when three jet nozzles 10 are used, it is important to arrange the three jet nozzles 10 at equal intervals as shown in FIG. 2 (the angle of any two adjoining jet nozzles being 120°). It has been found, however, that when more than three jet nozzles 10 are used, the jet nozzles are preferably arranged so that at least two angles formed between the adjoining jet nozzles 10 are 95° to 135° without disposing them at equal intervals although they are rotatingly symmetrical with respect to the central axial line of the melt. This facilitates the effective drawing of the melt 4b which has flown away in the form of fibers in the second zone 18. For example, when four jet nozzles 10 are used, they are preferably arranged so that as shown in FIG. 3, two angles $\theta$ become 95° to 135° (the other angles $\theta_2$ being 45° to 85°). When six jet nozzles are used, they are preferably disposed so that three (or two) angles $\theta_1$ become 95° to 135°.

Figure 5:
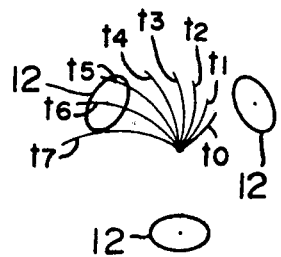
FIGS. 5 and 6 are schematic views showing the relation between a melt which has flown in the form of fibers and a stream of gas.
Figure 6:
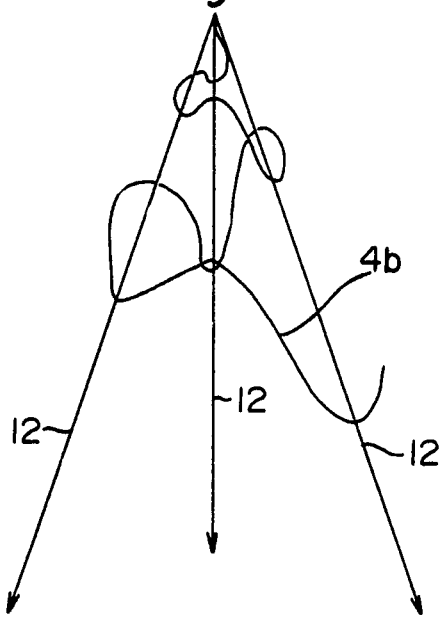

This may be ascribed to the following reason. FIG. 5 is a view which illustrates the melt 4b which has flown in fiber form in the second zone 18 and the high speed gas streams 12, and in which $t_0$ shows the state of the fibrous melt 4b at a certain time, $t_1$ its state after a lapse of $\Delta t$ seconds, and $t_2$, its state after a lapse of $\Delta t$ seconds. The fibrous melt 4b, before entering one of the gas streams 12, advances in the radial direction by the force of inertia of rotation which it possesses. When it enters one of the gas streams, its forward end is situated outwardly of the central axial line of the gas stream 12 as shown at $t_5$, and the part subsequent to it crosses the gas stream 12. On the other hand, the gas stream 12 is highest in speed at its center, and as it goes farther away from the center, the speed becomes lower. Accordingly, the fibrous melt 4a which crosses the gas stream 12 undergoes the action of the fastest gas stream at the part situated at the center of the gas stream 12, and therefore, is advanced most downwardly. The part of the melt which is apart from the center of the gas stream in the radial direction undergoes the action of a gas stream having a lower speed, and is advanced to a lesser extent downwardly. Hence, the fibrous melt 4a which enters the gas stream 12 and crosses it is advanced to the greatest extent at that part which has entered the center of the gas stream 12, and is advanced to a lesser extent downwardly at the part which is further forward or rearward of that part. By this difference in displacement, the fibrous melt 4b is drawn. This is the same when the melt has passed one of the gas streams 12 after a lapse of 6 $\Delta t$ seconds and enters the next gas stream 12. It is presumed therefore that the fibrous melt 4b which has flown from the end of the cone 4a advances along the locus illustrated in FIG. 6.

If, however, the angle formed between two adjacent gas streams is less than 95°, the fibrous melt 4b which has passed one of the gas streams cannot advance over a sufficient distance outwardly in the radial direction before it enters the next gas stream. Hence, when it enters the next gas stream, the forward end of the fibrous melt 4b is located inwardly of the center of the gas stream, and the fibrous melt 4b has not sufficiently crossed the gas stream, but only the forward end of the fibrous melt 4b has entered the gas stream in part. For this reason, the fibrous melt 4b cannot sufficiently receive the displacement difference, and cannot be sufficiently drawn.

If the above angle is more than 135°, there is a tendency that the gas stream 12 cannot form the melt into a conical shape 4a and rotate it in good condition.

(e) Relation between the "effective hole diameter" of gas jet nozzle and the "drawn diameter" of the gas stream and relation between the "blow-out diameter" defined cooperatively by a plurality of gas jet nozzles and the "drawn diameter" of the gas stream when at least three straight-line high speed gas streams are used The gas stream 12 has a different speed distribution from place to place in its section. But when the central axial line of the gas stream is defined as a line which extends through the center of that part of the gas stream which has the highest flow speed and the greatest density of motion energy, it is approximately equal to the extension of the central axial line of the gas jet nozzle 10 (when the nozzle 10 is not straight, but curved, the extension of the tangential line to the center line of the nozzle at the outlet of the nozzle). If the distance between the central axial line of the melt and the central axial line of the gas stream at the focal point 14 (if this distance differs from gas stream to gas stream, an average value is determined) is the drawn radius and the value obtained by doubling it is "drawn diameter", the drawn diameter equals the diameter of a circle that inscribes the central axial lines of a plurality of gas streams at the focal point (or the average of the long diameter and the short diameter of an ellipse). Let the flow speed of a gas stream leaving the gas jet nozzle 10 be V, the number of rotations per second of the conical melt 4b be n, the coefficient of sliding be k, and the drawn diameter be $D_2$, $n = kV/\pi D_2$. Hence, if the drawn diameter $D_2$ is decreased, the number of rotations increases. Consequently finer fibers can be produced in larger amounts per unit time. When $D_2$ increases, the force to confine the melt within a conical shape becomes weak, and a stable cone of the melt cannot be obtained. Accordingly, it is preferred to adjust $D_2$ to not more than 7 mm. If the $D_2$ value is made too small, gas streams collide with each other because they have a certain size. As a result, an undesirable disturbance of gas stream occurs to splash off the melt. Hence, there is an optimal relation between the effective hole diameter $d_1$ and the drawn diameter $D_2$ which determine the size of the gas stream which is required to obtain a stable cone of the melt. Preferably, a combination of the effective hole diameter $d_1$ and the drawn diameter $D_2$ is selected from the area surrounded by five straight lines as shown in FIG. 7 (see Example 5). The effective diameter $d_1$ is expressed by the equation $d_1 = 4S/l$ wherein S is the cross sectional area of the outlet of the gas jet nozzle 10 and l is the length of the periphery. Thus, where the cross sectional area of the jet nozzle outlet is circular, $d_1$ equals the diameter of this circle.

The hatched area in FIG. 7 is obtained by plotting the effective hole diameter in $d_1$ mm on the axis of abscissas X and the drawn diameter in $D_2$ mm on the axis of ordinates Y, and connecting points (0,0), (3.0, 5.3), (3.0, 7.0), (2.4, 7.0) and (0,2.0) successively by a straight line.

The effective hole diameter $d_1$ is difficult to decrease to less than 0.05 mm because of restrictions on working precision. When $d_1$ is at least 0.05 mm, the drawn diameter $D_2$ is preferably at least 0.1 mm. If the effective hole diameter $d_1$ becomes too large, the amount of the gas used increase uneconomically. Preferably, therefore, $d_1$ is not more than 3 mm.

If the average distance between the centers of the outlets of at least three gas stream jet nozzles 10 and the central axial line of the melt, as multiplied by 2, is defined as the "blow-out diameter", larger blowout diameters $D_1$ have the same effect as would be obtained when the effective hole diameter $d_1$ becomes larger. This is because the gas stream 12 gradually increases in sectional area after being jetted out from the jet nozzle 10. For this reason, disturbance of the gas stream tends to occur unless the drawn diameter $D_2$ is adjusted to at least 1/10 of the blow-out diameter $D_1$. Furthermore, as mentioned above, the gas stream must gradually approache the melt after being jetted out, and therefore, it is necessary that the blow-out diameter $D_1$ is larger than the drawn diameter $D_2$. Accordingly, the blow-out diameter $D_1$ must be less than 10 times, preferably 1.3 to 3.0 times, the drawn diameter $D_2$.

(f) Length of the gas stream jet nozzle when at least three straight-line high speed gas streams are used In order to form the melt into a stable conical shape 4a in the first zone 16, and cause it to fly from the tip of the cone 4a as a continuous filamentary melt 4b in the second zone 18, at least three straight-line gas streams should not collide with each other to such an extent that the collision impedes a smooth advance of the melt. Preferably, they collide with each other as a mass at a position several centimeters below the focal point 14 within the second zone 18.

The gas streams described above form a so-called "eye of typhoon", and the center of the vicinity of the focal point 14 is at a lower pressure than the surrounding parts, whereby the melt is sucked from melt-flowing nozzle 8 to form a stable conical shape 4a within the first zone 16. When the gas streams enter the second zone 18 and collide with each other at a position several centimeters below the focal point, the turbulent flow resulting from the collision is sufficiently remote from the cone 4a, and therefore, does not disturb the formation of stable cone 4a. The gas streams which have collided with each other in the vicinity of the above-mentioned position form a mass and further by their combined forces draw the fibrous melt 4b which has entered the gas streams upstream of the second zone. Therefore, finer fibers can be obtained more effectively.

If the gas streams collide with each other too strongly near the focal point 14, the pressure at the center near the focal point 14 decreases to a lesser extent as compared with the pressure of the surrounding part. Thus, the force to withdraw the melt from the nozzle 8 becomes weak and unstable, and this leads to a tendency that a cone is not formed stably. When the drawn diameter is increased so that the gas streams do not collide with each other near the focal point 14, the rotating speed which is imparted to the fibrous melt 4b at the beginning of the second zone 18 decreases. This means that the number of rotations to be given to the fibrous melt 4b is smaller, and the centrifugal force becomes weak. Consequently, the force to withdraw the filamentary melt from the end of the cone is weak, and the amount of the melt flowing decreases. Furthermore, it is impossible to attenuate the fibrous melt too much.

This tends to occur when the diverging (diffusing) angle of the gas stream 12 is large. Preferably, therefore, gas streams jetted out from the gas jet nozzles 10 are those which spread to a lesser extent with a smaller diverging angle. The spreading of the gas stream 12 has closely to do with the shape of the gas jet nozzle 10, and particularly with the ratio of the effective diameter of the nozzle to the length of the nozzle.

We have found in this connection that the length l of the nozzle 10 (see FIG. 1) is preferably at least 5 times the effective hole diameter $d_1$ of the nozzle 10 (see Example 6).

The nozzle length l denotes the shortest length from the gas inlet to the outlet of a nozzle which is measured in the advancing direction of the gas stream within the nozzle.

When the ratio of the length l to the effective hole diameter $d_1$ of the gas jet nozzle 10 is less than 5, the diffusion angle of the gas stream jetted out from the nozzle increases, and the gas streams jetted out from the nozzles tend to collide strongly near the focal point 14, thus causing the above-mentioned defect.

When the ratio of the length l to the effective hole diameter $d_1$ of the nozzle 10 is adjusted to at least 5, the diffusion angle of the gas streams 12 jetted out from the nozzle can be decreased, and therefore, a stable cone can be formed. Moreover, a strong rotating force can be imparted to it, thus making it possible to attenuate the melt with good efficiency. There is no particular upper limit to the ratio of the nozzle length l to the effective hole diameter $d_1$, but if it is too high, a pressure drop of the gas increases, and a working difficulty is involved. Preferably, the upper limit is set at 20, particularly at 10.

Some specific embodiments of the apparatus for performing the above method of this invention are described hereinbelow.

The apparatus shown in FIGS. 8-a and 8-b includes a melting crucible 2 (only a part of which is shown) for heat-melting a heat-softening material, and flowing the melt 4 at about 1,400° C. through a melt-flowing nozzle 8. A ring-like burner 100 made of a refractory material is provided around a melt-flowing nozzle 8. The melt-flowing nozzle 8 is made of platinum, and covered with refractories 101 and 102. The ring-like burner 100 includes a combustion chamber 103 at the upper part and a ring-like jet nozzle 10 for jetting out a high-temperature high-speed gas stream. At the inlet of the combustion, chamber 103, a fuel jet outlet 104 is provided nearly in contact with the ring-like combustion chamber, and along its periphery, a compressed air stream 105 is jetted out into the combustion chamber. The fuel ignited within the combustion chamber 103 becomes a high-temperature high-speed gas stream at about 1,000° C., and is jetted out from the ring-like nozzle 10. The ring-like jet nozzle 10 is inclined about 45° to the perpendicular line in its longitudinal section (see FIG. 8-a). Since the compressed air stream 105 is jetted out into the combustion chamber 103 so that it nearly contacts the periphery of the combustion chamber, the high-temperature high-speed gas stream has a component which causes the flow-out melt 4a to rotate counterclockwise in FIG. 8-b around the central axial line of the melt in the same direction. In other words, the high-temperature high-speed gas stream acts on the right side periphery of the flow-out melt when seen from the back of the gas stream. The size of the gas stream is controlled by the jetting angle of the compressed air stream 105 to the combustion chamber, and the extent of the rotating force of the gas stream within the combustion chamber is controlled by, for example, a control plate 90. Thus, the melt 4a which has flowed from the melt-flowing nozzle 8 is affected by the high-temperature high-speed gas stream in the first zone to form a stable cone. It is caused to fly crosswise in the second zone by the centrifugal force resulting from the rotation of the cone 4a. It is further drawn by the high-temperature high-speed gas stream to become fine and long fibers.

The apparatus shown in FIGS. 9-a and 9-b includes six burners 108 for jetting out a high-temperature high-speed gas which are disposed at equal intervals around a melt-flowing nozzle 8. The high-temperature high-speed gas streams jetted out from nozzles 10 of the burners 108 are directed obliquely and downwardly at a part just below the tip of the nozzle 8 in a manner such as to squeeze the melt flow. At a position where the melt flow is most squeezed, the center lines of the gases pass ¾ to ⅞ of the diameter of the melt which has just been flowed out from the melt-flowing nozzle 8, as shown in FIG. 9-b.

The inside of the burner 108 has such a structure that a fuel and compressed air are jetted out respectively through conduits 111 and 112 into combustion chamber 113 to burn the fuel and to jet out the resulting high-temperature high-speed gas. The surrounding of the combustion chamber is cooled by cooling water flowing through a conduit 109 and a discharge pipe 110. The burners 108 are disposed so that the focal point is situated at a distance about two times the inside diameter of the melt-flowing nozzle 8 from the lower end of the melt-flowing nozzle 8.

The apparatus shown in FIGS. 10-a and 10-b includes burners 114 for jetting out a high-temperature high-speed gas stream which is equipped with a ring-like combustion chamber 103 and six nozzles 10 for jetting out the high-temperature high-speed gas streams one end of each nozzle 10 being communicated with the combustion chamber. The jet nozzles 10, like the jet nozzles shown in FIGS. 9-a and 9-b, are arranged so that the high-temperature high-speed gas streams that have been jetted out are directed obliquely downwardly in such a manner as to squeeze the flow-out melt immediately below the tip of the melt-flowing nozzle 8, and at a position where it is most squeezed, the central lines of the gas streams pass ¾ to ⅞ of the diameter portion of the melt which has just been flowed out from the melt-flowing nozzle 8.

The apparatus shown in FIGS. 11-a and 11-b includes in addition to the apparatus shown in FIGS. 8-a and 8-b, a burner 116 equipped with a ring-like jet nozzle 115 which is used for jetting out a separate high-temperature high-pressure gas stream to the fibrous melt which has flown from the end of the cone of the melt and drawing it effectively to form fine fibers. In this apparatus, the melt which has flowed from the flow-out nozzle is formed into a stable conical shape in the first zone by the gas stream from the jet nozzle 10. In the second zone, the melt flies out continuously in a vortex shape in the form of fiber from the end of the cone, and after advancing over a certain length, is cut off by its own rotating centrifugal force. Fibers having a larger diameter fly farther from the central axial line of the melt. A high-temperature high-speed gas stream jetted out from the jet nozzle 115 acts on the fibrous melt, and the fibrous melt is drawn into fine fibers. As the diameter of the filamentary melt that has flown by the gas stream from the jet nozzle 10 is larger, it flies farther away from the central axial line of the melt. But that part of the filamentary melt which has flown farther undergoes a greater influence of the high-temperature high-speed gas stream from jet nozzle 115 of the burner 116 and is drawn to a greater extent. Accordingly, the resulting fibers have a uniform diameter and a good quality.

The apparatus illustrated in FIGS. 12-a and 12-b includes a burner 119 equipped with ring-like jet nozzles 10 one ends of which communicate with a common combustion chamber 103 and 8 drawing nozzles 118. In this apparatus, gases jetted out from the ring-like jet nozzles 10 causes the melt flowing out from the flow-out nozzle 8 to be formed into a conical shape in the first zone, and to fly from the end of the cone in the form of fiber in a vortex shape. Furthermore, like the case of FIGS. 11-a and 11-b, the fibrous melt is further drawn by the high-temperature high-speed gas streams jetted out from the drawing nozzles 118 to become fine fibers of uniform quality.

The apparatus shown in FIGS. 13-a and 13-b include three burners 108 of the same burners 108 illustrated in FIGS. 9-a and 9-b, and three drawing burners 121 whose structure is the same as the burners 108. The melt which has been formed into a fibrous shape by the action of the gas streams from the burners 108 flies away ahead of the focal point, and is attenuated into fine fibers by the action of the high-temperature high-speed gas streams jetted out from the drawing burners 121. As shown, the drawing burners 121 are located between the burners 108.

When six burners are used, the arrangement shown in FIGS. 13-a and 13-b is more effective for rendering the diameters of the resulting fibers uniform than the arrangement shown in FIGS. 9-a and 9-b. Furthermore, in order to render the fiber diameters uniform, it is more effective to build the outlets of the jet nozzles of the drawing burners 121 in a flattened shape so that the gas streams jetted out from there may sufficiently cover the gas streams from the burners 108.

In the apparatus shown in FIGS. 14-a and 14-b, a nozzle 8 is perforated on a bottom wall 123 of a melting crucible 2, and around the bottom wall 123, a pressure chamber 124 is formed, and the ring-like gas stream jet nozzle 10 is defined by the bottom wall 123 and a wall 125 of the chamber 124. The melt flowing out from the flow-out nozzle 8 undergoes the action of a gas stream jetted out from the jet nozzle 10, whereby it is attenuated into fine fibers and discharged. The gas stream to be jetted out from the jet nozzle 10 is approximately the same as the gas stream jetted out from the jet nozzle 10 in FIGS. 8-a and 8-b. The jetting angle of compressed air 105 to the pressure chamber 124 and the degree of rotation of the gas stream within the chamber 124 are controlled by a control plate 90.

In the apparatus shown in FIGS. 15-a and 15-b, a melt-flowing nozzle 8 and a gas jet nozzle 10 are formed in the bottom wall 203 of a crucible for heat-melting a heat-softening material. In this apparatus, from the feeder 208 the heat-softening material to be fiberized is placed into a material hopper 224 in the upper part of the crucible 2, and through air-tight dampers 206 and 207, reaches a melting section 201 of the crucible 2. The crucible 2 is closed by either of the dampers 206 and 207 and maintained air-tight. The pressure of the inside of the crucible is maintained at a suitably elevated pressure by connecting a pipe 212 including a pressure-control valve 213 and a pressure gauge 211 to a bomb 214 containing an inert gas such as nitrogen or argon. This pressure also serves to control the amount of flow of the melt which flows out from the melt-flowing nozzle 8. The crucible 2 is made of heat resistant steel and includes a relatively thick bottom wall 203 made of heat-resistant steel. At the bottom wall 203 a melt-flowing nozzle 8 and a gas jet nozzle 10 are formed. The gas into the gas jet nozzle 10 passes through a pipe 225 connected to a gas-generating source (not shown), a pressure-control valve 221 and a pressure gauge 220, and via a gas heating section 219, is heated to a temperature of about 1,100° C., and reaches the bottom wall 203. From holes 218 and 217, the heated gas stream is fed into the gas jet nozzle 10. The gas heating apparatus 219 has a combustion chamber 226 surrounding conduits through which the gas passes, and heats the gas by the combustion of a fuel from a burner 222. The combustion exhaust gas is discharged from an exhaust pipe 223. On the other hand, the crucible 2 is surrounded by a refractory material which forms a combustion chamber 210. The heat-softening material within the crucible is heated to about 1,250° C. by the combustion of a fuel gas blown into the combustion chamber 210 by a burner 202. The combustion exhaust gas is released from a chimney 209.

In an apparatus of such a structure, the melt-flowing nozzle 8 and the gas jet nozzle 10 are provided in the bottom wall of the crucible. Hence, the structure is compact, and has the advantage that it is not necessary to register the positions of the melt-flowing nozzle 8 and the gas jet nozzle 10. Furthermore, since the amount of the melt flowing can be controlled by adjusting the internal pressure of the crucible, even when the diameter of the melt-flowing nozzle 8 becomes thicker as a result of corrosion, it can be compensated.

The embodiments of the apparatus of this invention described hereinabove with reference to FIGS. 8-a and 8-b to 15-a and 15-b can produce fibers of high quality from heat-softening materials at a considerably high energy efficiency. By making the following improvements these apparatuses can give fibers of even higher quality at a higher energy efficiency.

(a) Improvement of the shape of the outlet part of the gas jet nozzle in an apparatus equipped with at least three gas jet nozzles for jetting out straight-line gas streams:

Generally, a straight-line high-temperature high-speed gas stream jetted out from gas jet nozzle 10 gradually diverges into a conical shape after it has left nozzle 10. On the other hand, the outlet of gas jet nozzle 10, illustrated, for example, in FIGS. 9-a and 9-b and 10-a and 10-b crosses the central axis line of the jet nozzle (i.e., the gas stream advancing direction within the jet nozzle) at right angles thereto, and has a circular cross section. For this reason, the gas stream 12 from nozzle 10, as shown in FIG. 16, diverges symmetrically with respect to the extension of the central axial line of the jet nozzle 10 as a center. As shown in FIG. 16, the gas stream 12 that has been jetted out has a central stream 13 having a high density energy and an accompanying stream 15 having a relatively low density energy. To bring the outlet of the gas jet nozzle 10 as closest as possible to the melt 4a flowing from the melt-flowing nozzle 8 (FIG. 1) is preferred because it results in an increase in the rotating speed of the melt and a decrease in the diameter of the resulting fibers. However, if the outlet of the nozzle 10 is caused to approach too closely to the melt 4a, not only the accompanying stream 15 which serves for the rotation of the melt, but also the central stream 13 collide with the melt 4a, and it is difficult to form a stable cone of the melt. Accordingly, this leads to the defect that the fibers which have flown from the end of the cone and are drawn contain unfiberized masses such as beads or flakes. When the central axial line of the gas jet nozzle 10 is inclined downwardly and excessively apart downwardly from the outlet face of the melt-flowing nozzle 8 in an attempt to prevent the central stream 13 of the gas stream 12 from directly contacting the cone 4a, the position at which the accompanying stream 15 of the gas stream acts on the melt moves downwardly, the length of the heat-softening material after flowing out becomes excessively large, and its advancing becomes discontinuous. Thus, stable continuous filaments cannot be formed, and lumps of the melt, called shots, are prone to occur. Theoretically, the length of the heat-softening material after flow out would become smaller to obviate the defect if the gas jet nozzle 10 is inclined more downwardly to bring it closer to the melt-flowing nozzle. In actual operation, this is difficult.

The above defect can be remedied by cutting away a part of the inner wall in the vicinity of the outlet of gas jet nozzle 10 which is farther from the flow-out melt 4a. In the apparatus shown in FIGS. 17-a and 17-b, the inner wall is cut out at a part farther from the melt-flowing nozzle 8. The outlet of the jet nozzle 10, as shown in FIG. 17-b, is an ellipse elongated in the radial direction from the central axial line of the flow-out melt 4a. Hence, the compressed gas stream which has passed through the gas jet nozzle is released into a fiber blowing atmosphere faster at its outer peripheral portion than at its inner peripheral portion, and becomes an expanded gas stream. Thus, at the outlet of the gas jet nozzle, the gas stream 12 is jetted out deviatingly outwardly as shown in FIG. 18, as compared with the case of FIG. 16.

The gas stream which has been jetted out from the gas jet nozzle is schematically shown in FIG. 19 at its section perpendicular to the central axial line of the melt at a position (focal point) closest to the melt. In FIG. 19, the reference numeral 4a represents the melt, and portions 13 and 15 surrounded by a solid line show the central stream and the accompanying stream of the gas stream when the outlet end surface of the jet nozzle is perpendicular to the central axial line of the jet nozzle and its section is circular (FIG. 16). Portions 13 and 15 surrounded by a dotted line show the central stream and the accompanying stream of the gas stream when that part of the inner wall of the outlet of the jet nozzle which is farther from the melt 4a is cut away (FIG. 18). In the former, the central stream 13 is relatively close to the melt, but in the latter, the position of the accompanying stream 22 near the melt remains the same while the central stream 21 is considerably remote from the melt as compared with the original position. In the former, the formation of a stable cone of the melt is prone to be impeded by the approaching central stream 13. But in the case of the latter, the central stream 21 departs from the melt, and therefore, the formation of a stable cone of the melt is not impeded.

A fibrous melt 4b flies from the end of the conical melt 4a rotated by the accompanying stream 15, and rotates about the end of the cone as a center. By the effect of the centrifugal force, the fibrous melt 4b enters the central stream 13 of the gas stream 12, and is drawn downwardly to a remote place to become fibers having the desired fine diameter.

When the fibrous melt 4b is drawn by the central stream 21, the drawing action is performed to a greater extent when the central stream is apart from the central axial line of the melt than when it is close to the central axial line, and therefore fibers having a smaller diameter can be obtained. The reason for this additional advantage has not yet been elucidated, but is presumed to be as follows: The fibrous melt 4b delivered from the end of the cone 4a of the melt is of a tapered shape which gradually becomes finer as it departs from the central axial line of the melt. In the latter case where the fibrous melt 4b enters the central stream of the gas stream at a portion which is relatively fine, a stronger drawing action will be excerted than in the case of the former wherein it enters the central stream at a portion which is relatively thick.

This is more effective when the melt-flowing nozzle 8 and the gas jet nozzle 10 are formed in an integral unit 28 (usually the bottom wall of a crucible) (the apparatus shown in FIGS. 15-a and 15-b). In this case, no space exists between the melt-flowing nozzle 8 and the gas jet nozzle 10 unlike the case where the nozzle 8 and the nozzle 10 are made of different pieces. Furthermore, the thicknesses of both nozzles can be used conjointly, and they can be brought very close to each other.

When both nozzles are brought closer to each other, there is more likelihood that beads and flakes are generated owing to the local contact of the central stream of the gas stream with the flow-out melt 4a. But by cutting away that part of the outlet portion of the nozzle 10 which is apart from the melt to form a substantially elliptical outlet, the central stream 13 can be deviated towards that side which is farther away from the melt-flowing nozzle 8 while maintaining the accompanying stream 15 on that side which is nearer the melt. This ensures the production of fibers substantially free from the above defects.

FIG. 21 shows an example where a hole having a central exial line which forms an angle of 45° with the gas jet nozzle 10, the same hole diameter as the gas jet nozzle 10 (for example, a diameter of 1 mm), and a central axis at a point farthest from the melt-flowing nozzle 8 at the outlet end of the gas jet nozzle 10 is provided so as to cut away that part of the inner wall in the vicinity of the outlet of the gas stream jet nozzle 10 which is farther from the melt. FIG. 22 shows an enlarged view of the outlet portion of the gas jet nozzle.

Preferably, the inner wall in the vicinity of the outlet of the gas jet nozzle is cut away at a portion which is farthest from the melt and is detracted along the central axial line of the gas jet nozzle by a distance x which is 1/5 to 2 times the diameter of the nozzle $d_1$, as shown in FIG. 23. Or it is preferred that the inner wall be cut away in a direction apart from a cylindrical stream of the melt by the distance y which is the same as distance x, as shown in FIG. 22.

(b) Projecting length of the melt-flowing nozzle in an apparatus in which a melt-flowing nozzle and a gas jet nozzle are formed in separate members:

The apparatus of this invention for producing fibers from heat-softening materials are classified into a separate-type in which the melt-flowing nozzle and the gas jet nozzle are formed in separate members as shown in FIGS. 8-a and 8-b to FIGS. 13-a and 13-b, and an integral type in which the two nozzles are formed in one member (for example, in the bottom wall of a crucible) as shown in FIGS. 15-a and 15-b.

In the separate-type apparatus, the outlet of the gas jet nozzle 10 is brought as close as possible to the melt-flowing nozzle 8 fitted to the bottom wall 5 of crucible 2 in fitting a gas flow jet burner in an attempt to use the energy of the jet gas stream effectively. Hence, the length of the melt-flowing nozzle 8 ranging from the bottom wall of the crucible to the tip (to be referred to as the length of the melt-flowing nozzle) is determined approximately by the size (thickness) of the gas jet burner.

When a high viscosity heat-softening material such as glass is made into fibers, a crucible made of a thermally stable metal such as a platinum-rhodium alloy is used, and an electrical current of high ampere and low voltage is applied to both end edges of the crucible to heat the crucible. However, since the melt-flowing nozzle projects from the bottom wall of the crucible, electric current is difficult to flow therethrough, and heat is hardly generated. Hence, the temperature of the melt-flowing nozzle must be maintained at a suitable point by heat transmission between the melt and thermally stable metal. However, the forward end of the melt-flowing nozzle becomes lower in temperature as the nozzle length becomes larger. For example, when the nozzle length is 10 mm and the temperature of the bottom wall of the crucible is about 1,000° C., the temperature of the forward end of the nozzle becomes at least 100° C. lower than the crucible bottom.

When fibers having a diameter of about 4 microns or less are to be formed using such a material as glass, metal or plastics, the viscosity of the heat-softening material which has just been flowed out from the nozzle must be adjusted to 10–200 poises, preferably 50–100 poises, in order to render the fiber diameter finer and reduce the amounts of unfiberized masses (such as flakes, balls, or shots). It is important therefore how efficiently the viscosity of the heat-softening material at the outlet of the melt-flowing nozzle should be adjusted to the above range.

In view of the above fact, it has been found important to reduce the thickness of the gas jet burner to not more than 10 mm thereby to shorten the length of the melt-flowing nozzle to not more than 10 mm, and to reduce the temperature drop from the undersurface of the bottom wall of the crucible to the forward end of the melt-flowing nozzle.

As previously stated, in order to utilize the energy of the gas stream after jetting out from the jet nozzle effectively, and to draw the melt with good efficiency, it is desirable to maintain the diffusion angle of the gas stream after jetting out at a constant value by adjusting the length of the gas jet nozzle to at least 5 times as large as its effective hole diameter.

Accordingly, it is important to reduce the size of the gas jet nozzle under the above-mentioned conditions.

As one method, the inventors have contrived the shape of the combustion chamber (hollow part) of the gas jet burner as shown in FIG. 24. Specifically, the gas jet nozzle 10 is of such a shape that it corsses the hollow part substantially at right angles thereto at its inlet. For this reason, the length of the gas jet nozzle can be very effective. When the length l of the melt-flowing nozzle 10 exceeds 10 mm, e viscosity of the melt flowing from the nozzle cannot be adjusted as desired unless the temperature of the crucible is rendered extremely high.

By reducing the thickness of the gas jet burner and shorten the length of the melt-flowing nozzle, there is no need to raise the temperature of the crucible excessively in order to adjust the viscosity of the melt at the outlet of the melt-flowing nozzle 8 to the desired value. Consequently, the wear of the crucible material by deformation or evaporation, etc. due to the high temperatures is reduced, and the service life of the crucible has been prolonged exceedingly. Shorter lengths of the melt-flowing nozzle are better, but if the length is too short, the gas jet burner cannot be provided. The lower limit to the length of the melt-flowing nozzle is usually 1.5 mm.

(c) Arrangement of a plurality of melt-flowing nozzles:

As already described with reference to FIG. 1, according to the method and apparatus of the present invention, the melt which has flowed from the melt-flowing nozzle 8 is formed into a conical shape 4a in the first zone 14 and rotated around its central axial line. In the second zone 16, the melt flies away from the tip of the cone 4a in the form of fiber 4b in a vortex shape, and is accelerated and undergoes a pulling force thereby to be drawn and made into fine fibers. High-speed gas stream 12 for transforming the melt into a conical shape 4a and simultaneously rotating it in the first zone 14 is used as the high-speed gas stream for drawing and attenuating the fibrous melt 4a which has flown from the tip of the cone 4a. If required, another high-speed gas stream for drawing can be used. In any case, the high speed gas streams used for drawing must have a high energy in order to form fibers of fine diameters sufficiently drawn and attenuated. Generally, the energy required to draw and attenuate the fibrous melt 4b in the second zone 16 is greater than that required for transforming the melt into conical shape 4a and rotate it in the first zone 14. Seometimes, the former becomes several times as high as the latter. For this reason, the saving of the energy required for drawing and attenuating the fibrous melt can result in a remarkable saving of the entire energy required for fiber formation.

The inventors have found that the energy required for drawing and attenuation can be markedly saved by arranging at least three melt-flowing nozzles 8 closely such that when a circle with a radius of 10 mm is drawn with the center of each nozzle as a central point, at least three overlapping portions between the circles appear, and thereby utilizing the high speed gas stream for the flowing of melt from the adjoining flowing nozzles also as high speed gas streams for drawing and attenuation (See Example 7).

In other words, when a first high speed gas stream (to be referred to as a primary high speed gas stream) is caused to act on the fibrous melt 4b, and at the same time, a second high speed gas stream (to be referred to as a secondary high speed stream) which is in substantially the same direction as the primary gas stream is caused to act on it, the fibrous melt 4b can be very effectively drawn and attenuated.

The reason for this is not well known, but the inventors presume as follows:

As shown in FIG. 25-a, when the fibrous heat-softening material 3 is introduced into the primary high speed gas stream 5, the degree of its attenuation has to do with the force F which acts on the material 3. The force F is generated by the action of the high speed gas stream on the softening material, and its magnitude becomes larger as the length L over which the high speed gas stream acts on the attenuated fibers becomes larger. This is because the material rapidly solidifies as a result of attenuation, and the pulling force is transmitted upstream. When the secondary high speed gas stream 7 is further applied as shown in FIG. 25-b in addition to the primary high speed gas stream 5, the length L' over which the high speed gas stream vanishes by the force of the secondary high speed gas stream 7 is larger than the length L in the case of the primary high speed gas stream alone. Hence, the force F' which acts on the heat-softening material becomes greater than F. This means that in the presence of the secondary high speed gas stream, the fibers become finer.

Accordingly, fibers drawn and attenuated to greater degrees can be produced by using a high speed gas stream for exclusive use in drawing (acting as a secondary drawing gas stream) in addition to a high speed gas stream (which acts as a primary drawing gas stream) for transforming the flow-out melt into a conical shape 4a and rotating it. However, when a separate high speed gas stream for exclusive use in drawing is used, a larger energy is consumed. However, when at least three melt-flowing nozzles are arranged close to each other in the manner mentioned above, a high speed gas stream (that is, a primary drawing high speed gas stream) for the melt which flows from one melt-flowing nozzle also acts as a secondary drawing high speed gas stream for the melt which flows out from the adjacent melt-flowing nozzle. This can lead to the marked reduction of energy required for producing fibers drawn and attenuated to the desired diameter.

It is better to bring melt-flowing nozzles closer to each other and provide more nozzles which are close to each other. But there is a physical limit to it, for example, owing to the overlapping of the flowing nozzles and gas stream jet nozzles. Furthermore, the effect becomes smaller as the nozzles depart from each other farther. If at least three, preferably at least five, fiber-forming units (melt-flowing nozzles) are arranged such that when a circle with a radius of 10 mm, preferably 5 mm) is drawn with a center of each melt-flowing nozzle as a central point, there are at least three overlapping portions between the circles, better results can be obtained than in the case of providing a single fiber-forming unit. Generally, the limit of approach between melt-flowing nozzles is about 1 mm in terms of a distance between the centers of the two approaching nozzles. There are various modes of bringing the fiber-forming units close to each other. Some examples are shown in FIGS. 26-a to 26-d. In FIG. 26-a, seven fiber-forming units including a melt-flowing nozzle 8 are arranged in a straight-line at an interval of 16 mm, and in this case, there are six overlapping portions 11 of circles 9 with a radius of 10 mm. In FIG. 26-b, three fiber-forming units having a melt-flowing nozzle 8 are arranged with their centers forming the apexes of an equilateral triangle, and there are three overlapping portions 11. In FIG. 26-c, three fiber-forming units having a melt-flowing nozzle 8 are arranged in a straight-line at an interval of 3 mm, and there are three overlapping portions 11. In FIG. 26-d, three arrangements of the type shown in FIG. 26-i are arranged at a pitch of 50 mm.

(d) Heating of the bottom of crucible at which both a melt-flowing nozzle and a gas jet nozzle are provided:

As already mentioned, in order to form good quality fibers, it is important to control the viscosity of the heat-softening material in the viscous state to be flowed from the melt-flowing nozzle as desired. Thus, in a separate-type apparatus in which a melt-flowing nozzle and a gas jet nozzles are formed in separate members, it is important to shorten the projecting length of the melt-flowing nozzle from the undersurface of the bottom wall of the crucible and reduce the temperature drop of the melt when passing through the melt-flowing nozzle.

On the other hand, as is illustrated in FIGS. 15-a and 15-b, in a so-called integral type apparatus in which melt-flowing nozzle 8 and gas jet nozzle 10 are formed at the bottom wall 203 of the crucible, the following problem exists. The bottom wall 203 is cooled by, for example, heat radiation from its undersurface, and heating of a gas to be fed to gas jet nozzle 10 is limited. Thus, the temperature of the jet nozzle 10 is always lower than the temperature of the melt 4. Accordingly, the melt is markedly cooled during passage through the bottom wall. When it is desired to maintain the viscosity of the melt at the outlet of the melt-flowing nozzle 8 at a suitable value, for example, about 50 poise, it is necessary that the melt should be of a material which softens at low temperature and thus has a viscosity of 50 poises at not more than 1,100° C. Otherwise, the temperature of the melt in the crucible 2 must be raised to above 1,250° C. In such a case, a relatively cheap material such as stainless steel cannot be used as refractories to form the crucible, and it is difficult to choose a proper refractory.

The above problem can be solved by flowing an electric current through the bottom wall of the crucible where both the melt-flowing nozzle and the gas jet nozzle are formed, thereby to heat it electrically.

In the apparatus shown in FIGS. 27-a and 27-b, a crucible 2 made of an alloy consisting of 90% platinum and 10% rhodium which is an electrically conductive refractory includes a side wall 300 and a bottom wall 303. Three frusto-conical melt-flowing nozzles 8 are perforated in a row in the bottom wall 303 which is built in one integral unit, and around each of the nozzles 8, four gas jet nozzles 10 are perforated. Furthermore, on both sides of each of the nozzles 8, two gas-feeding passages 302 are perforated in parallel to each other which extend in a direction substantially at right angles to the central axis of the flow nozzle 8. The gas jet nozzles 8 communicate with the gas-feeding passages 302. Preferably, each of the passages 302 has a cross sectional area equal to or larger than the sum total of the cross sectional areas of the gas jet nozzles 10 leading to the gas-feeding passages 302 so that a gas of uniform pressure can be fed to each of the gas jet nozzles 10. The heat-softening material 4 is melted in a melting tank (not shown), and flowed into crucible 2, and is maintained at a temperature of, say, about 1,150° C. The vicinity of the melt-flowing nozzle 8 is controlled in temperature by passing an electric current through lead lines 306 and terminals 307 connected to an electric source, and ss maintained, for example, at a temperature of about 1,200° C. The melt leaves three flow-out holes 8 along the gas-feeding passages 302, and rotated and attenuated by a high-temperature high-pressure gas which has been jetted out from a gas jet nozzle 10, and then formed into a mat by a conventional apparatus not shown. The high pressure gas, for example, air at a pressure of about 5 Kg/cm$^2$, is pre-heated by a known method to about 500° C., and then passes through an inlet 308, and via passage 302, is jetted out from the gas jet nozzle 10. There are four gas jet nozzles 10 for each melt-flowing nozzle 8, and two are connected to the same gas-feeding passage. The angle formed by two nozzles 10 is 60° when determined on the basis of the projected images onto the horizontal surface. Furthermore, these four gas jet nozzles 10 are symmetrical with respect to the central axial line of the melt-flowing nozzle 8. The angle of each of the gas jet nozzle to the horizontal surface is all 45°.

In the apparatus shown in FIGS. 28a and 28b, bottom wall 403 of platinum crucible is adapted to be heated by passing electric current. For example, the melt maintained at a temperature of, say, 1,250° C., is adjusted to a temperature of, for example, 1,300° C. while it passes through 24 melt-flowing nozzles 8 having a frusto-conical shape at the upper part which are perforated on the bottom wall 403 of the crucible. As the high pressure gas, steam heated to a temperature of 600° C. at a pressure of 15 Kg/cm$^2$.g is used. The steam which has entered through an inlet 411 is jetted out from nozzle 10 via gas-feeding passage 407. Five gas-feeding passages 407 are provided in parallel to one another and extend in a direction at right angles to the central axial line of the melt-flowing nozzle 8. Between the adjoining passages 407, a melt-flowing nozzle 8 is disposed along the longitudinal direction of the passage 407. There are three gas jet nozzles 10 for each melt-flowing nozzle 8. The jet nozzles 10 corresponding to each flow-out nozzle 8 form an angle of 120° to each other when determined by their projected images to the horizontal surface, and each has an inclination angle to the perpendicular direction of 50°.

On the other hand, from an electric source not shown, an electric current flows through the bottom wall 403 via lead wires 409 and terminals 408, and the bottom wall 403 is maintained at a temperature of, say, 1,300° C. According to this apparatus, a heat-softening material having a relatively high melting temperature which has a viscosity of 50 poises at a temperature of 1,300° C. can be fiberized. Therefore, an inexpensive material can be used, and the service life of the crucible can be prolonged.

In the apparatus shown in FIGS. 27a and 27b and FIGS. 28a and 28b, it is sometimes necessary to flow a considerable current through the bottom wall 303 or 403 of the crucible 2 to heat it, in order to adjust the viscosity of the melt flowing from the nozzle 8 to the desired value. It is virtually difficult, if not impossible, to flow an electric current concentratingly only through that part which requires heating and in which melt-flowing nozzle 8 and gas jet nozzle 10 are formed. Heat, therefore, is generated in other part of the bottom wall 303 and 403 (usually, both end edges which leads to the terminal). This part therefore attains an exceedingly high temperature, and there is a tendency that the conductive refractory which forms the bottom wall cannot withstand such excessive high temperatures. In order to avoid this, a method is conceivable in which the cross sectional area of a part other than that part where the flow-out nozzle 8 and the jet nozzle 10 are formed formed is increased to reduced the density of the electric current at that part. This method, however, would increase the amount of the conductive refractory (such as platinum alloy) and raise the cost drastically. Hence, it is not altogether a suitable measure. In order to effectively prevent a part of the bottom wall from becoming excessively high in temperature, it is preferred that a passage for feeding a gas into the jet nozzle 10 is provided along that part of the bottom wall which becomes excessively high in temperature, that is, the part where flow-out nozzle 8 and jet nozzle 10 are not formed, and such a part is cooled by the gas passing through this passage. This effectively prevents the particular part of the bottom wall of the crucible from becoming excessively high in temperature, and there can also be obtained an advantage that the gas fed into the jet nozzle 10 is heated.

Figure 29:
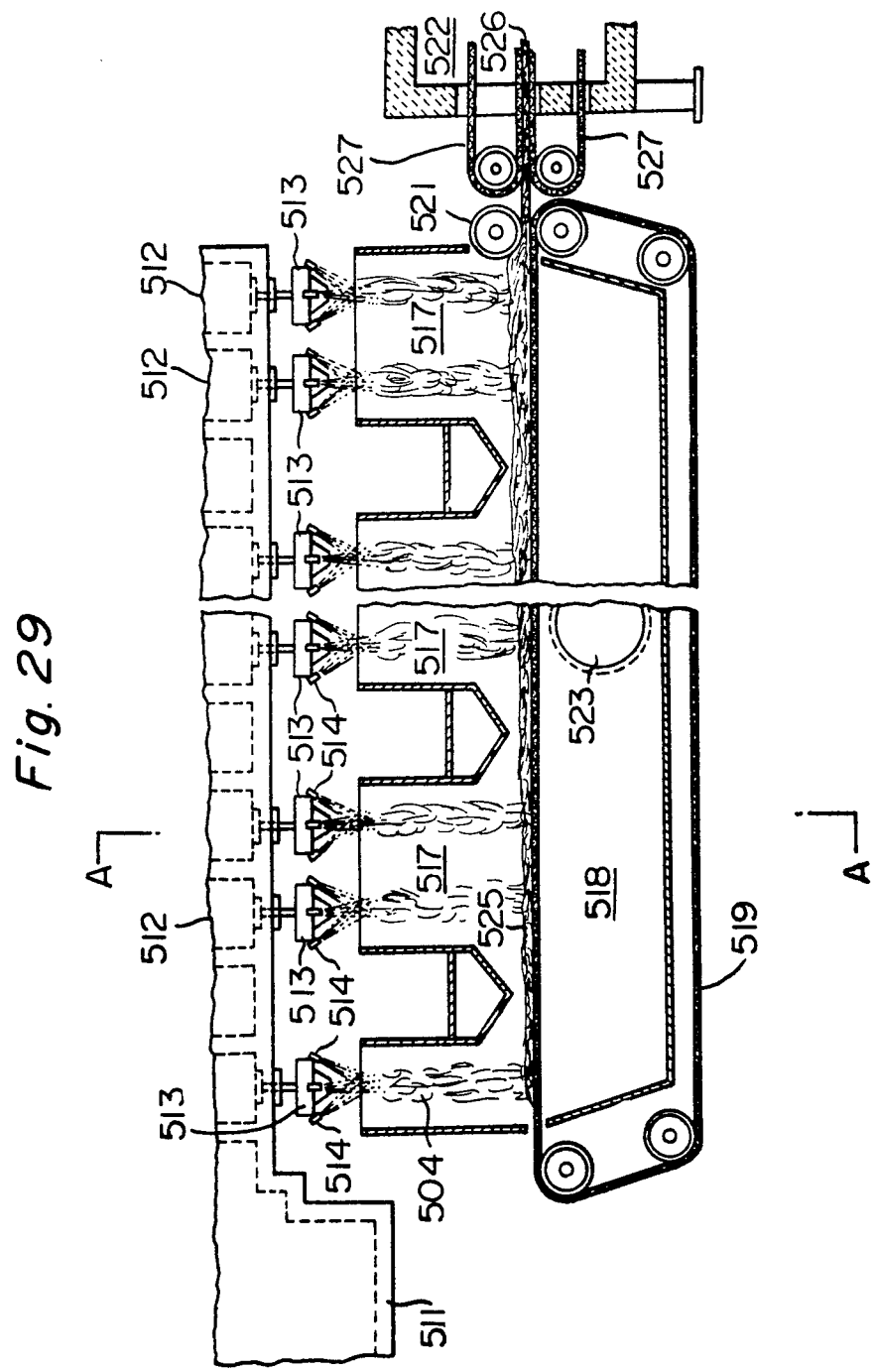
FIG. 29 is a sectional view in the longitudinal direction of a glass fiber mat manufacturing apparatus equipped with the apparatus of this invention.

Now, referring to FIGS. 29 and 30, an apparatus for producing a glass mat which is equipped with the apparatus for producing fibers in accordance with this invention is described briefly.

Glass which is melted in a melting furnace 511 passes through a distribution channel 524 and a pre-furnace 512, and made into fibers 504 by a fiber-forming unit 513 in accordance with this invention. A thermoplastic resin as a binder is sprayed by a plurality of applicator nozzles 514 onto the fibers 504 which enter a hood 517. A mesh conveyor 519 is provided at the open bottom of the hood 517. A sucking chamber 518 is provided at that position of the mesh conveyor 519 which is below the fiber-forming unit 513. The sucking chamber 518 is connected to an air exhausting device (not shown) of an ordinary strcture for providing pressures below atmospheric pressure within the chamber 518 through a suction tube 523. The negative pressure within the chamber 518 promotes the collection of fibers on the conveyor, and exhaust gases of the blast for fiberization through the suction pipe 523. The fibers 504 formed from the fiber-forming unit 513 accumulate and become a fibrous layer 525. The conveyor 519 carries the plate-like fibrous layer 525 to a position beneath a sizing roll 521 which press-forms it to a mat 526 of a relatively high density. The mat 526 is carried through a curing chamber 522 where the resin binder on the fiber is cured by heating according to an ordinary method and the circulating air in the curing chamber. The cured fibrous mat is compressed by a blet 528 in order to obtain the desired hardness.

The following Examples further illustrate the present invention.

EXAMPLE 1

Using an apparatus of the type shown in FIGS. 31a and 31b, the following experiment was conducted. The results are shown in Table 1.

In FIGS. 31a and 31b, the molten glass was flowed out from crucible 2 through flow-out nozzle 8. It was formed into a conical shape 4a by high speed air stream 12 jetted out from air jet nozzle 10, and left in the form of a fibrous melt 4b. The gas stream 12 most closely approached the central axis of the cone 4a at a position about 2 mm below the tip of the flow-out nozzle 8. The air jet nozzle 10 was of a circular shape with a sectional diameter of 1.0 mm with an angle of 45° with respect to the horizontal surface. Three nozzles 10 formed an angle of 120° to each other when determined by their projected images onto the horizontal surface. The outlet of the jet nozzle 10 did not contact the outlet of the flow-out nozzle 8, but was situated as close thereto as possible. The test was performed by adjusting the depth of the tank so that the amount of glass flow was 1 kg per hour. Air was at a pressure of 10 kg/cm$^2$.G, and the glass had a viscosity of about 50 poises at the outlet of the flow-out nozzle 8.

Table 1

| Effective hole diameter of the melt-flowing nozzle (mm) | Fiber diameter (microns) | Proportions of unfiberized masses (%) |
| --- | --- | --- |
| 3 | 30 | 50 |
| 2.5 | 10 | 30 |
| 2 | 5 | 10 |
| 1.5 | 4 | 7 |
| 1 | 3 | 2 |
| 0.5 | less than 2 | less than 1 |

When the effective hole diameter of the flow-out nozzle was 0.5 mm, it was impossible to adjust the amount of glass flow to 1 kg/hour.

It can be seen from Table 1 that when the effective hole diameter of the flow-out nozzle is 3 mm, the proportion of unfiberized masses reaches 50%, but when the effective hole diameter decreases to 2.5 mm or below, the proportion of the fiberized masses decreases, and the fiber diameter also decreases.

EXAMPLE 2

Figure 32:
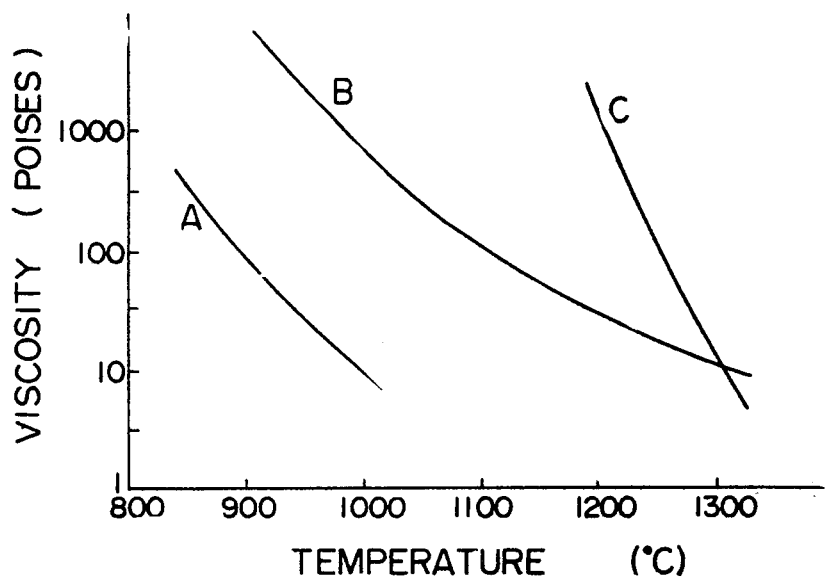
FIGS. 32 and 33 are diagrams showing the temperature-viscosity relation of the heat-softening materials used in the Examples.
Figure 34:
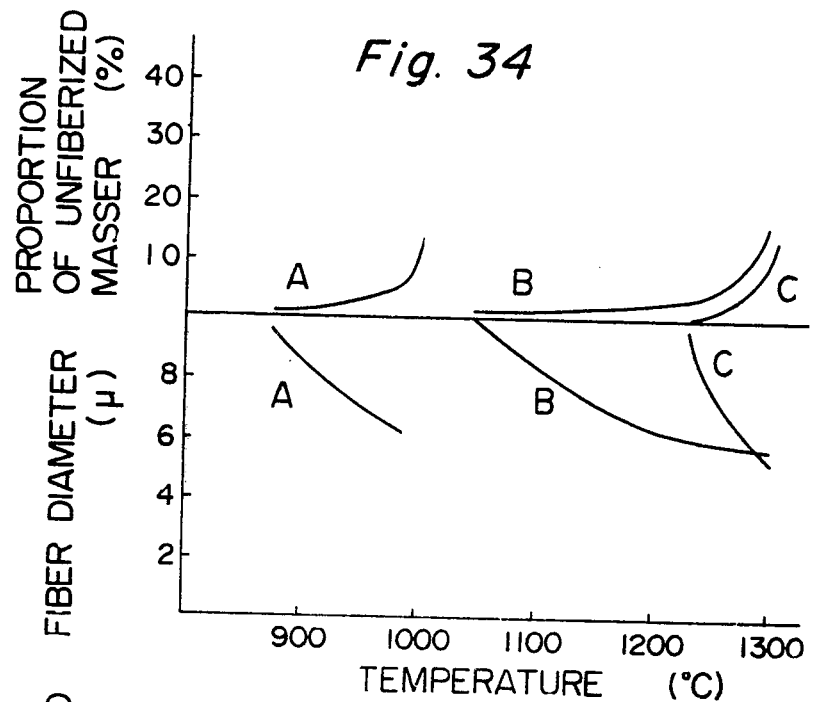
FIG. 34 is a diagram showing the relation among the temperature, the fiber diameter and the proportion of unfiberized mass.

Three glasses A, B, C having a temperature-viscosity curve shown in FIG. 32 were fiberized by an apparatus of the type shown in FIGS. 10a and 10b. It was found that they could be fiberized when the temperatures of the three glasses A, B and C immediately before rotation by gas stream were 870°–990° C., 1040°–1300° C., 1230°–1300° C., respectively. The qualities of the fibers obtained were as shown by lines A, B and C in FIG. 34. When the temperatures of the glasses exceeded the above ranges immediately before rotation, the viscosity of the glass became less than 10 poises, and the resulting fibers contained more than 20% of unfiberized masses. When the temperatures of the glasses were lower than the lower limits of the temperature ranges specified above, the viscosity of the glasses exceeded 200 poises. Thus, the diameters of the resulting fibers became more than 10 microns, and an efficient drawing of the fibers became difficult.

EXAMPLE 3

Figure 35:
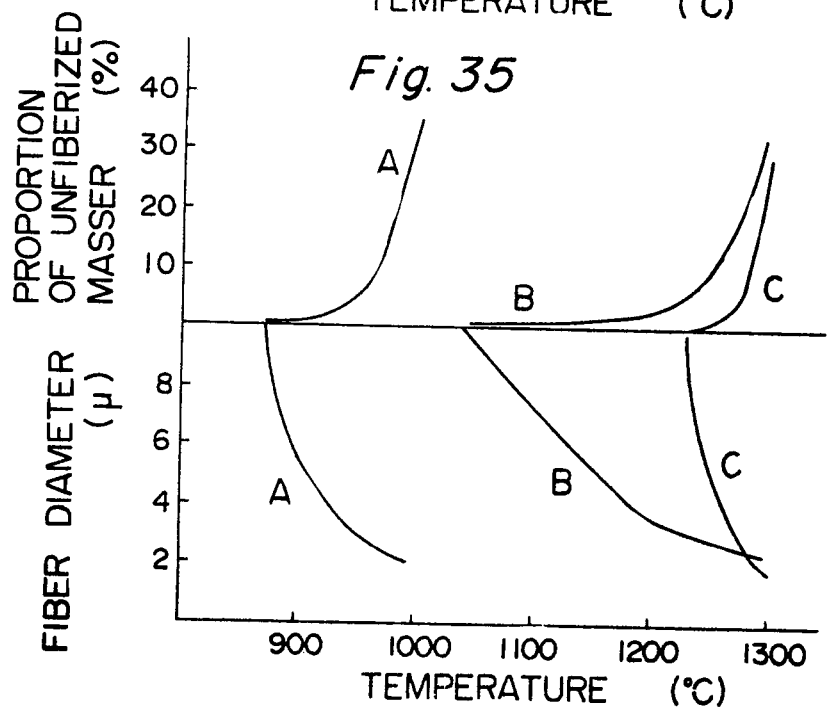

Glasses, A, B and C shown in FIG. 32 were fiberized using three air jet nozzles obtained by removing every other air jet nozzle in the apparatus shown in FIGS. 10a and 10b. The results are substantially the same as in Example 2 with regard to the temperature ranges within which fiberization was possible, and the quality of the fibers were as shown in FIG. 35.

EXAMPLE 4

Figure 33:
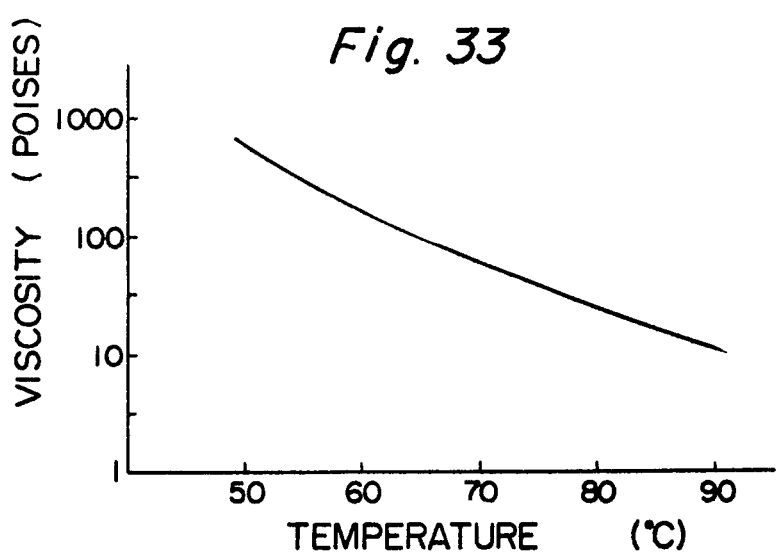

Millet jelly having a temperature-viscosity curve as shown in FIG. 33 was fiberized using an apparatus of the type shown in FIGS. 10a and 10b. It could be fiberized at a temperature of 55° to 90° C. At a temperature below 55° C., thick shots flew away intermittently, and at a temperature of above 90° C., it did not become fibers, but remained atomized.

EXAMPLE 5

In FIGS. 36a and 36b, high pressure air at 2 to 10 kg/cm².gauge was passed through an inlet 611, and via a passage 612, was jetted out from a gas jet nozzle 10. Thus, glass having a viscosity of about 50 poises at 1,300° C. was flowed through melt-flowing nozzle 8.

As shown in Table 2, ten samples having different inclination angles α, blow-out diameters $D_1$, drawn diameters $D_2$ and effective hole diameters $d_1$ were prepared, and tested. The results are shown in Table 2.

The relation between the drawn diameter $D_2$ and the effective hole diameter $d_1$ was plotted in FIG. 7 with respect to each of the samples. In Table 2, "good" means that a stable cone was obtained, and in this case, flowless substantially continuous glass fibers with a diameter of about 10 microns were obtained. In Table 2, "poor" means that a stable cone could not be obtained, and glass fibers containing much unfiberized masses such as shots, balls and films resulted. As is clear from Table 2, the results were all "poor" in Samples Nos. 2 and 3 whose inclination angle were outside the range of 20° to 70°, Sample No. 6 whose ratio of the blow-out diameter $D_1$/the drawn diameter $D_2$ was more than 10, and Sample Nos. 7 and 8 whose effective hole diameters and drawn diameters were not within the hatched ranges shown in FIG. 7.

Table 2

| | Conditions | | | | | |
| --- | --- | --- | --- | --- | --- | --- |
| Sample No. | Inclination angle α° | Blow-out diameter $D_1$ mm | Drawn diameter $D_2$ mm | Effective diameter $d_1$ mm | $\dfrac{D_1}{D_2}$ | Results |
| 1 | 50 | 5 | 3 | 1 | 1.7 | Good |
| 2 | 75 | 5 | 3 | 1 | 1.7 | Poor |
| 3 | 15 | 5 | 3 | 1 | 1.7 | Poor |
| 4 | 45 | 5 | 1.5 | 0.5 | 3.3 | Good |
| 5 | 45 | 10 | 3 | 0.6 | 3.3 | Good |
| 6 | 45 | 10 | 0.8 | 0.3 | 12.5 | Poor |
| 7 | 45 | 5 | 3 | 2 | 1.7 | Poor |
| 8 | 45 | 5 | 5 | 0.5 | 1.0 | Poor |
| 9 | 45 | 5 | 2.5 | 0.6 | 2.0 | Good |
| 10 | 45 | 4 | 3 | 1 | 1.3 | Good |

EXAMPLE 6

Using an apparatus of the type shown in FIGS. 31a and 31b, test was performed with varying diameters $d_1$ and lengths l of the gas stream jet nozzle 10. The results are shown in Table 3. The gas jet nozzle 10 had a circular cross sectional shape.

Table 3

| Effective hole diameter($d_1$) (mm) | Nozzle length (l, mm) | Results |
| --- | --- | --- |
| 0.6 | 2 | Cone unstable; much beads and flakes |
| | 2.5 | Cone somewhat unstable |
| | 3 | Cone stable; reduced beads |
| | 5 | Cone stable; reduced beads |
| 1.0 | 3 | Cone not stable; much beads and flakes |
| | 4.5 | Cone somewhat unstable |
| | 5 | Cone stable; reduced beads |
| | 10 | Cone stable; reduced beads |
| 1.5 | 6 | Cone somewhat unstable |
| | 7.5 | Cone stable; reduced beads |
| | 10 | Cone stable; reduced beads |

The temperature of the glass in the cone was 1,200° C. (50 poises), and the inside diameter of the glass melt-flowing nozzle 8 was 2 mm. The angle formed between the central axial line of the gas jet nozzle 10 and the central axial line of the glass melt was 45°. The distance between the outlet of the gas jet nozzle 10 and the central axial line of the glass melt was about 2.0 mm, and the drawn diameter at the focal point was 0.7 to 1.7 mm. The pressure of the high pressure air to be fed to the gas jet nozzle was about 5 kg/cm².G.

EXAMPLE 7

In an integral glass fiber-forming unit 2 shown in FIGS. 37a and 37b, a molten glass 4 having a viscosity of 50 poises and a temperature of 1,100° C. was stored, and in the lower part of the unit 2, a molten glass flowing nozzle 8 having an inverted frustoconical shape at the upper part with the diameter of the thinnest part being 1.5 mm was perforated. Around the flowout nozzle 8 were provided four gas stream jet nozzles 10 having a diameter of 0.6 mm. Air at high temperatures and pressures was conducted by nozzles 10 through conduits 625 and gas feed hole 624, and was jetted out to form gas streams. Each two of the nozzles 10 constituted a pair, and formed an angle of 60° to each other at the horizontal surface. Each of the nozzles was symmetrical with respect to the central axial line of the fiber-forming unit. Using this apparatus, air at 1000° C. and 8 kg/cm². G was jetted out to form glass fibers having an average fiber diameter of 8 microns.

When an apparatus of the type shown in FIGS. 38a and 38b in which 10 fiber-forming units of the same structures as above were arranged in a straightline at a pitch of 3 mm, fibers having a diameter of less than 3 microns were obtained under quite the same consistions as above. In order to obtain fibers with a diameter of 8 microns, a pressure of 3 kg/cm².G was sufficient.

What we claim is:

1. An apparatus for producing fibers from a glass material, said apparatus comprising a melt crucible having flow-out nozzles of 0.5–2.5 mm in effective hole diameter of heating a glass material to form a viscous melt and flowing said melt continuously through said flow-out nozzles; and a gas jet comprising at least 3 jet nozzles around each of said flow-out nozzles in which at least 2 of the angles formed between the central axial lines of adjacent jet nozzles are from 95° to 135°, the central axial line of said each gas jet nozzle not crossing the central axial line of said flow-out nozzle and being positioned in the same direction relative to the central axial line of said flow-out nozzle when viewed from each gas jet nozzle, whereby at least 3 high-speed gas streams having a component which gradually approaches the central axial line of the melt toward the flowing direction of the melt and a component in a direction which then gradually departs from said central axial line are formed, and by these high-speed gas streams, said melt is rotated around its central axial line and formed into a substantial conical shape in which the cross section gradually decreases toward the direction of flow in a first zone which ranges from the flow-initiating part of the melt to the part at which the gas stream most closely approaches the central axial line of the melt, and in a second zone subsequent to the first zone, the melt is allowed to fly in a fibrous form from the tip of the conical shape in a vortex form in the direction of flow and outwardly in the radial direction.

2. The apparatus of claim 1 wherein the blow-out diameter $D_1$ defined by the straight-line high speed gas stream is in the following relation with respect to the drawn diameter $D_2$, $$D_2 < D_1 \leq 10 D_2.$$

3. The apparatus of claim 1 wherein said flowout nozzle extends downwardly in the perpendicular direction from the bottom surface of said crucible.

4. The apparatus of claim 1 wherein said effective hole diameter $d_2$ is 0.5 to 2.0 mm.

5. The apparatus of claim 1 wherein heat-melting of the heat-softening material within the crucible is controlled so that the viscosity of the melt immediately before the rotation of the melt in the first zone becomes 10 to 200 poises.

6. The apparatus of claim 5 wherein the viscosity of the melt is 50 to 100 poises.

7. The apparatus of claim 1 wherein said gas jet means is adapted to jet out a high speed gas stream inclined at an angle of 20° to 70° to the central axial line of the melt.

8. The apparatus of claim 7 wherein said angle is 35° to 55°.

9. The apparatus of claim 1 wherein said gas jet means includes three nozzles disposed at equal intervals around said flow-out nozzle.

10. The apparatus of claim 1 wherein said gas jetting means includes at least four jet nozzles disposed symmetrically with respect to the central axial line of the melt to be flowed out continuously from the flow-out nozzle as a rotating symmetrical axis in such a manner that at least two of the angles formed between the adjacent jet nozzles become 95° to 135°.

11. The apparatus of claim 1 wherein the effective hole diameter $d_1$ of each of said jet nozzles and the drawn diameter $D_2$ defined by straight-line high speed gas streams jetted out from the jet nozzles have a dimension that is selected from an area obtained by connecting points (0, 0), (3.0, 5.3), (3.0, 7.0), (2.4, 7.0), and (0, 2.0) in a diagram with $d_1$ (mm) on the axis of abscissas and $D_2$ (mm) on the axis of ordinates.

12. The apparatus of claim 11 wherein the blow-out diameter $D_1$ defined by the straight-line high speed gas stream is in the following relation with respect to the drawn diameter $D_2$, $$D_2 < D_1 \leq 10 D_2.$$

13. The apparatus of claim 12 wherein the above relation is expressed by the following equation, $$1.3 D_2 \leq D_1 \leq 3 D_2.$$

14. The apparatus of claim 1 wherein the length l of said jet nozzle is at least 5 times its effective hole diameter $d_1$.

15. The apparatus of claim 1 wherein said crucible has a plurality of flow-out nozzles, said flow-out nozzles being disposed close to each other so that when a circle with a radius of 10 mm is drawn about the center of each flow-out nozzle as a central point, at least three overlapping portions of these circles occur.

16. The apparatus of claim 1 wherein said flowout nozzle projects from the undersurface of the bottom wall of the crucible by a length of not more than 10 mm, and said jet nozzle is formed in a member provided around said flow-out nozzle.

17. The apparatus of claim 1 wherein both of the flow-out nozzle and the jet nozzle are formed on the bottom wall of crucible, said wall being made of one integral member.

18. The apparatus of claim 1 wherein means for jetting out a gas for drawing is provided so as to jet out a separate high speed gas stream onto the melt which has flown from the tip of the conical shape in the form of fiber.

19. An apparatus for producing fibers from molten glass material, said apparatus comprising a melt crucible having flow-out nozzles of 0.5–2.5 mm in effective hole diameter for heating a glass material into a viscous melt and flowing the melt continuously through the nozzles; a gas jet means comprising at least 3 jet nozzles around each of said flow-out nozzles in which at least 2 of the angles formed between the central axial lines of adjacent jet nozzles are from 95° to 135°, the central axial line of said each gas jet nozzle not crossing the central axial line of said flow-out nozzle and being positioned in the same direction relative to the central axial line of said flow-out nozzle when viewed from each gas jet nozzle; and a gas supply passage formed within the bottom wall of said melt crucible and being connected to said gas jet nozzle within said bottom wall, and further, a unit consisting of one of said flow-out nozzles and said at least 3 gas jet nozzles positioned around it being present in plural numbers along said gas supply passage on a straight line.

* * * * *